(12) United States Patent
Nakai et al.

(10) Patent No.: US 12,153,461 B2
(45) Date of Patent: Nov. 26, 2024

(54) INPUT DEVICE

(71) Applicant: ALPS ALPINE CO., LTD., Tokyo (JP)

(72) Inventors: Takashi Nakai, Fukushima (JP); Kazunari Takahashi, Miyagi (JP); Tatsuhiro Tomiyama, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/366,791

(22) Filed: Aug. 8, 2023

(65) Prior Publication Data
US 2023/0384816 A1 Nov. 30, 2023

Related U.S. Application Data

(63) Continuation of application No. PCT/JP2022/010136, filed on Mar. 8, 2022.

(30) Foreign Application Priority Data

Mar. 11, 2021 (JP) ................. 2021-039504

(51) Int. Cl.
*G05G 5/04* (2006.01)
*G05G 1/015* (2008.04)
(Continued)

(52) U.S. Cl.
CPC ............... *G05G 5/04* (2013.01); *G05G 1/015* (2013.01); *G05G 1/02* (2013.01); *G05G 5/03* (2013.01);
(Continued)

(58) Field of Classification Search
CPC ............ G05G 5/04; G05G 1/015; G05G 1/02; G05G 2505/00; H01H 13/20
See application file for complete search history.

(56) References Cited

U.S. PATENT DOCUMENTS 5,240,547 A * 8/1993 Itagaki ............... B62D 1/06
156/481
6,360,631 B1 * 3/2002 Wortmann ............... G05G 5/03
267/209

(Continued)

FOREIGN PATENT DOCUMENTS

JP 2004-139948 5/2004
JP 2008-027843 2/2008
(Continued)

OTHER PUBLICATIONS

International Search Report for PCT/JP2022/010136 mailed on May 31, 2022.

*Primary Examiner* — Vicky A Johnson
(74) *Attorney, Agent, or Firm* — IPUSA, PLLC

(57) ABSTRACT

An input device includes an operation shaft extending in a first direction, linearly movable in the first direction, and having a tip portion; a force sensation generator configured to apply a force to the operation shaft; a sensor configured to detect an amount of movement of the operation shaft; a range-of-motion adjuster configured to change a maximum push-in position of the operation shaft; and a range-of-motion adjustment motor configured to operate the range-of-motion adjuster. The range-of-motion adjuster has a contact portion with which the tip portion of the operation shaft comes into contact. The range-of-motion adjuster changes the maximum push-in position of the operation shaft by being operated to change a contact position of the tip portion with respect to the contact portion in the first direction.

20 Claims, 22 Drawing Sheets

(51) Int. Cl.
  *G05G 1/02* (2006.01)
  *G05G 5/03* (2008.04)
  *G06F 3/02* (2006.01)
  *H01H 13/20* (2006.01)

(52) U.S. Cl.
  CPC .......... *G06F 3/0202* (2013.01); *H01H 13/20* (2013.01); *G05G 2505/00* (2013.01)

(56) References Cited

U.S. PATENT DOCUMENTS

| | | | |
|---|---|---|---|
| 2005/0023117 A1 | 2/2005 | Kasakawa et al. | |
| 2007/0159307 A1* | 7/2007 | Jannasch | H01H 3/227 340/407.1 |
| 2008/0023315 A1 | 1/2008 | Morisawa | |
| 2021/0294431 A1* | 9/2021 | Clark | G10H 1/0555 |

FOREIGN PATENT DOCUMENTS

| | | |
|---|---|---|
| JP | 2011-065846 | 3/2011 |
| JP | 2019-219948 | 12/2019 |

\* cited by examiner

INPUT DEVICE

CROSS-REFERENCE TO RELATED APPLICATIONS

This application is a continuation of International Application No. PCT/JP2022/010136, filed on Mar. 8, 2022 and designating the U.S., which claims priority to Japanese Patent Application No. 2021-039504, filed on Mar. 11, 2021. The contents of these applications are incorporated herein by reference in their entirety.

BACKGROUND OF THE INVENTION

1. Field of the Invention

The disclosure herein relates to an input device.

2. Description of the Related Art

Patent Document 1 below describes a technique by which a motor of an operation device that includes an operation member configured to be pushed by an operator is controlled so as to control the load of a push operation and provide a tactile sensation to the operator in accordance with the push-in position of the operation member.

However, in such a conventional technique, the maximum push-in position of an operation shaft of an input device cannot be easily and dynamically changed.

RELATED-ART DOCUMENTS

Patent Documents

Patent Document 1: Japanese Laid-open Patent Publication No. 2019-219948

SUMMARY OF THE INVENTION

An input device according to an embodiment of the present disclosure includes an operation shaft extending in a first direction, linearly movable in the first direction, and having a tip portion; a force sensation generator configured to apply a force to the operation shaft; a sensor configured to detect an amount of movement of the operation shaft; a range-of-motion adjuster configured to change a maximum push-in position of the operation shaft; and a range-of-motion adjustment motor configured to operate the range-of-motion adjuster. The range-of-motion adjuster has a contact portion with which the tip portion of the operation shaft comes into contact. The range-of-motion adjuster changes the maximum push-in position of the operation shaft by being operated to change a contact position of the tip portion with respect to the contact portion in the first direction.

BRIEF DESCRIPTION OF THE DRAWINGS

Other objects and further features of the present invention will be apparent from the following detailed description when read in conjunction with the accompanying drawings, in which.

DETAILED DESCRIPTION OF THE EMBODIMENTS

In the following, embodiments of the present invention will be described with reference to the accompanying drawings. In the following description, for the sake of convenience, the Z-axis direction is referred to as an upper-lower direction (an example of a "first direction"), the X-axis direction is referred to as a front-rear direction, and the Y-axis direction is referred to as a left-right direction (an example of a "second direction"). The positive Z-axis is referred to as an upward direction, the positive X-axis direction is referred to as a forward direction, and the positive Y-axis direction referred to as a rightward direction.

First Embodiment (Outline of Input Device 100)

Figure 1:
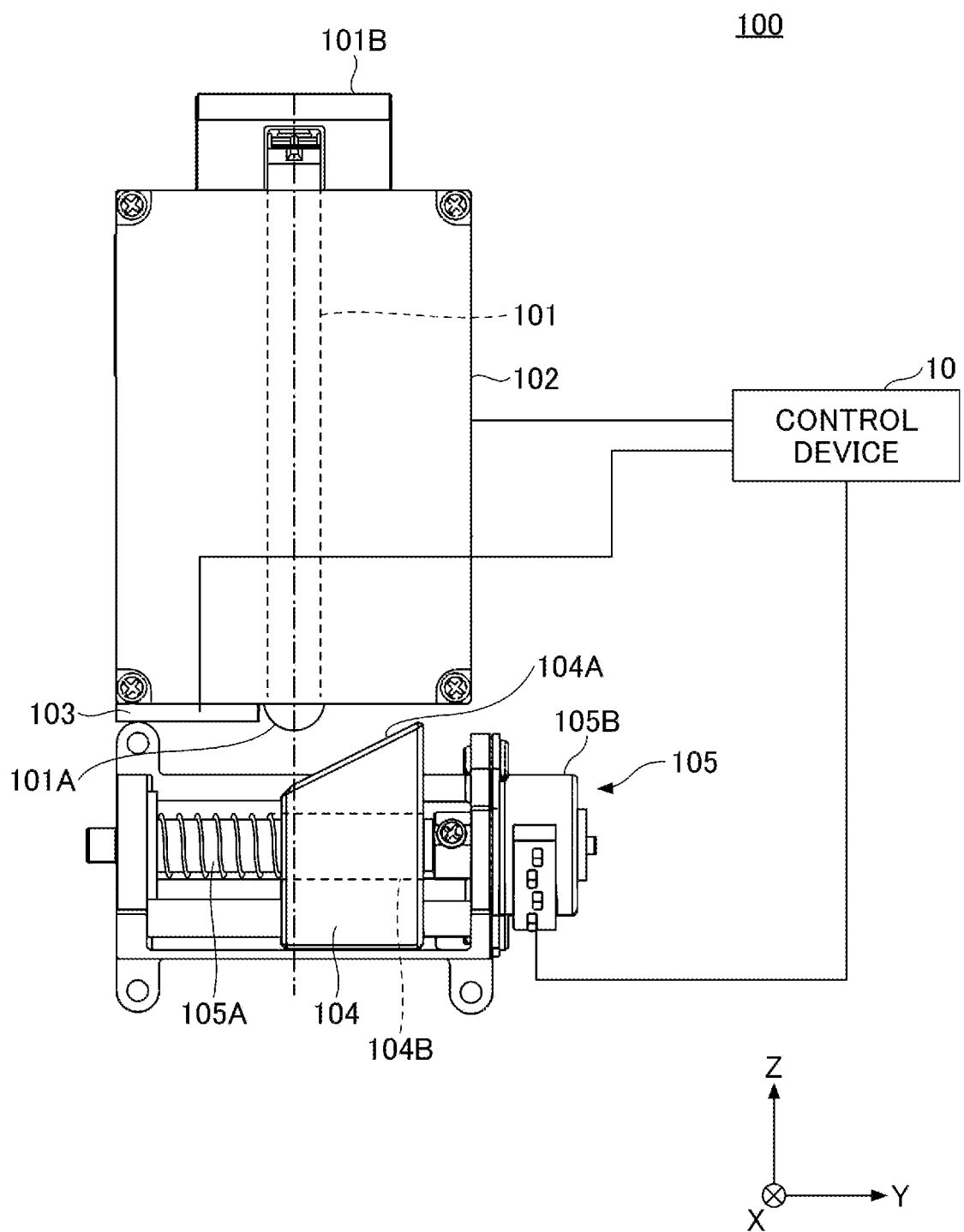
FIG. 1 is a side view of an input device according to a first embodiment.

FIG. 1 is a side view of an input device 100 according to a first embodiment. The input device 100 illustrated in FIG. 1 is used in various types of electronic devices (for example, game controllers and the like) and is configured to be pressed. As illustrated in FIG. 1, the input device 100 includes an operation shaft 101 that extends in the upper-lower direction (Z-axis direction). An operation knob 101B is attached to the upper end portion of the operation shaft 101. The input device 100 can move the operation shaft 101 down by pressing the operation knob 101B down. The amount of downward movement of the operation shaft 101 is detected by a sensor 103, and is output from the sensor 103 to a control device 10.

As illustrated in FIG. 1, the input device 100 includes the operation shaft 101, a force sensation generator 102, the sensor 103, a range-of-motion adjuster 104, and a range-of-motion adjustment motor 105.

The operation shaft 101 is a rod-shaped member that extends in the upper-lower direction (Z-axis direction). The operation shaft 101 penetrates the inside of the force sensation generator 102. The operation shaft 101 is linearly movable within the force sensation generator 102 in the upper-lower direction (Z-axis direction). A hemispherical tip portion 101A is formed at the lower end portion (on the negative Z-axis side) of the operation shaft 101. The tip portion 101A projects from the lower surface of the force sensation generator 102. The operation knob 101B is attached to the upper end portion (on the positive Z-axis side) of the operation shaft 101. The operation knob 101B projects from the upper surface of the force sensation generator 102.

The force sensation generator 102 supports the operation shaft 101 that penetrates the force sensation generator 102 in the upper-lower direction (Z-axis direction) such that the operation shaft 101 is linearly movable in the upper-lower direction (Z-axis direction). In addition, the force sensation generator 102 is configured to apply a force to the operation shaft 101. In the first embodiment, the active-type force sensation generator 102 that can apply a driving force to the operation shaft 101 in the upper-lower direction (Z-axis direction) by electronic control is used. As the active-type force sensation generator 102, a linear motor or the like can be used, for example. However, the present invention is not limited thereto, and a passive-type force sensation generator 102 that can apply an operation load to the operation shaft 101 by electronic control may be used. As the passive force sensation generator 102, a voice coil motor or the like that uses a magnetic viscous fluid can be used.

The sensor 103 detects the amount of downward movement of the operation shaft 101. The sensor 103 outputs a detection signal indicating the detected amount of downward movement of the operation shaft 101 to the control device 10. For example, a position sensor can be used as the sensor 103.

The range-of-motion adjuster 104 is a member having a block shape (an approximately rectangular parallelepiped shape). The upper surface of the range-of-motion adjuster 104 is a contact surface 104A with which the tip portion 101A of the operation shaft 101 comes into contact. As illustrated in FIG. 1, the contact surface 104A is an inclined surface that is inclined such that its height is lowest at the end portion on the left side and gradually increases toward the right side. Further, the range-of-motion adjuster 104 has a through hole 104B that penetrates the range-of-motion adjuster 104 in the left-right direction.

The range of motion adjustment motor 105 is a device that can move the range-of-motion adjuster 104 in the left-right direction (Y-axis direction). The range of motion adjustment motor 105 includes a rotary shaft 105A having a rod shape and extending in the left-right direction (Y-axis direction), and a rotary drive body 105B capable of rotating the rotary shaft 105A. For example, a stepping motor is used for the rotary drive body 105B. The rotary shaft 105A is inserted into and disposed in the through hole 104B of the range-of-motion adjuster 104. The rotary shaft 105A and the through hole 104B constitute what is known as a "feed screw mechanism". A screw thread is formed on the outer peripheral surface of the rotary shaft 105A. Further, a screw thread is formed or a ball screw is provided on the inner peripheral surface of the through-hole 104B. Accordingly, the range of motion adjustment motor 105 can move the range-of-motion adjuster 104 in the left-right direction (Y-axis direction) by driving the rotary drive body 105B to rotate the rotary shaft 105A.

(Examples of Operation of Input Device 100)

Figure 2:
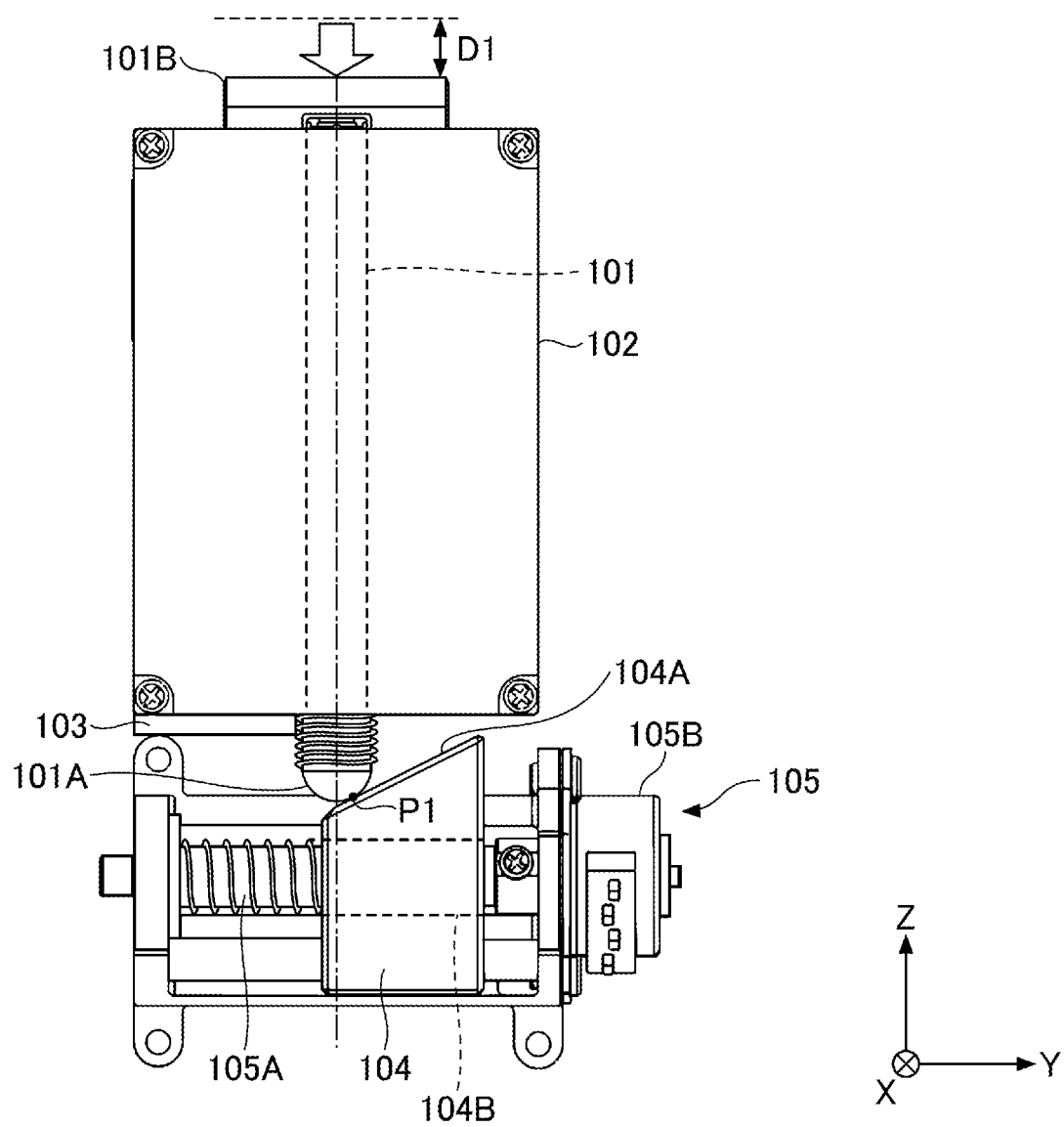
FIG. 2 is a side view illustrating a first example of the operation of the input device according to the first embodiment.
Figure 3:
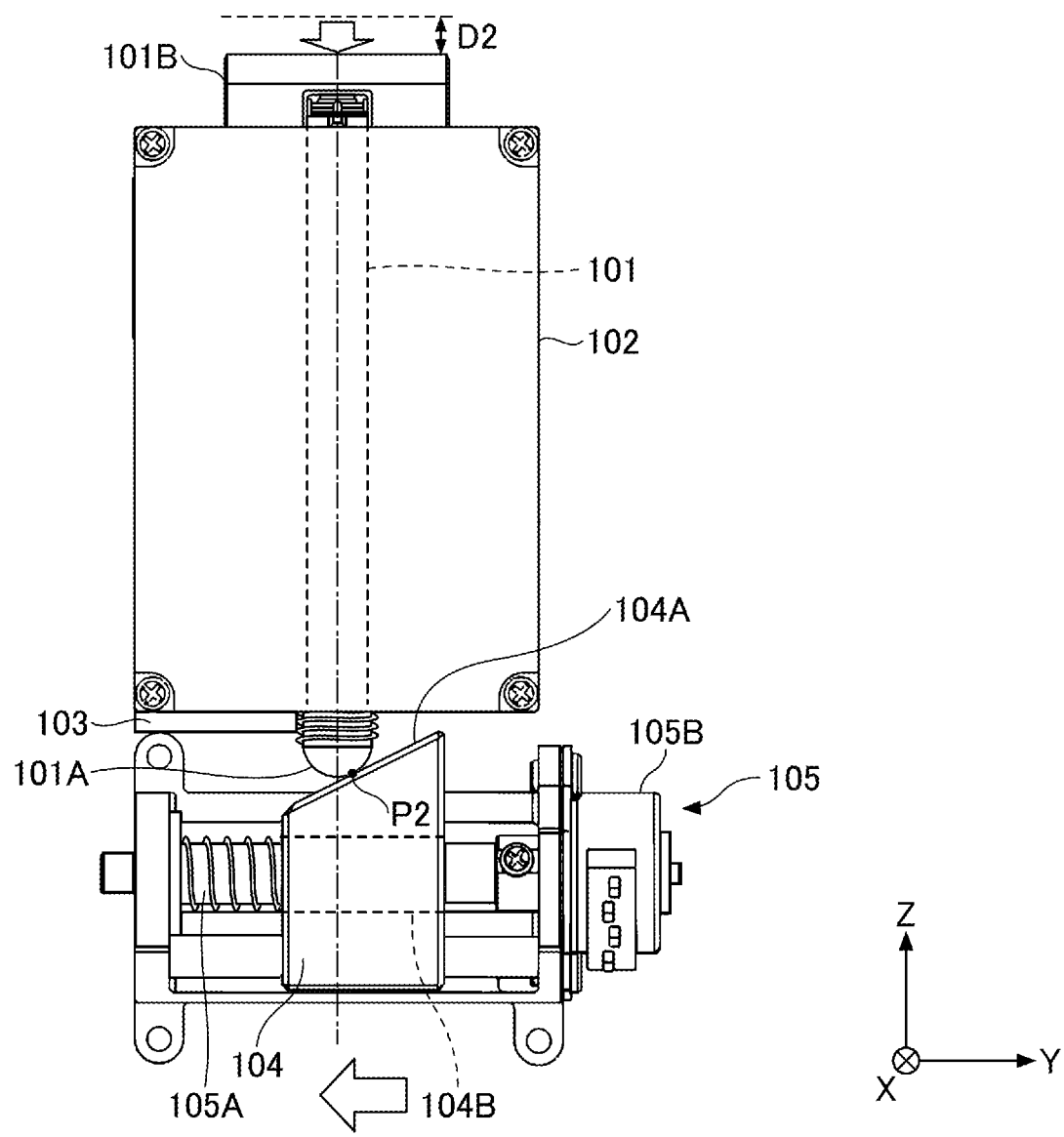
FIG. 3 is a side view illustrating a second example of the operation of the input device according to the first embodiment.

FIG. 2 is a side view illustrating a first example of the operation of the input device 100 according to the first embodiment. FIG. 3 is a side view illustrating a second example of the operation of the input device 100 according to the first embodiment.

In the input device 100 according to the first embodiment, upon the operation knob 101B being pressed, the operation shaft 101 is moved down. At this time, the amount of movement of the operation shaft 101 is detected by the sensor 103. In addition, at this time, the input device 100 can cause the force sensation generator 102 to apply a driving force to the operation shaft 101 in the upper-lower direction (Z-axis direction). Then, in the input device 100, the tip portion 101A of the operation shaft 101 contacts the contact surface 104A of the range-of-motion adjuster 104, thereby restricting the amount of downward movement of the operation shaft 101.

In the input device 100 according to the first embodiment, the maximum push-in position of the operation shaft 101 can be changed by moving the range-of-motion adjuster 104 in the left-right direction (Y-axis direction).

In the example illustrated in FIG. 2, a contact position P1 of the contact surface 104A of the range-of-motion adjuster 104 is located directly under the tip portion 101A of the operation shaft 101. The contact position P1 is a position near the left end of the contact surface 104A. Accordingly, in the example illustrated in FIG. 2, the operation shaft 101 can be pushed until the tip portion 101A of the operation shaft 101 contacts the contact position P1. D1 represents the maximum push-in amount of the operation shaft 101 in this state.

In the example illustrated in FIG. 3, the range-of-motion adjuster 104 is moved to the left (negative Y-axis side) from the state illustrated in FIG. 2 by the rotary drive body 105B being driven to rotate the rotary shaft 105A. Accordingly, in the example illustrated in FIG. 3, a contact position P2 of the contact surface 104A of the range-of-motion adjuster 104 is located directly under the tip portion 101A of the operation shaft 101. The contact position P2 is a position near the center of the contact surface 104A, and is located higher than the contact position P1. In the example illustrated in FIG. 3, the operation shaft 101 can be pushed until the tip portion 101A of the operation shaft 101 contacts the contact position P2. D2 represents the maximum push-in amount of the operation shaft 101 in this state, and is smaller than the maximum push-in amount D1 illustrated in FIG. 2.

As described above, by controlling the rotation of the rotary shaft 105A of the range-of-motion adjustment motor 105 to change the position of the range-of-motion adjuster 104 in the left-right direction (Y-axis direction) as desired, the input device 100 according to the first embodiment can change the maximum push-in amount of the operation shaft 101 as desired. Accordingly, the input device 100 according to the first embodiment can easily and dynamically change the maximum push-in position of the operation shaft 101.

In particular, in the input device 100 according to the first embodiment, the contact surface 104A is the inclined surface. Therefore, a height position at which the tip portion 101A of the operation shaft 101 contacts the contact surface 104A can be changed in a stepless manner. Thus, the maximum push-in amount of the operation shaft 101 can be changed in a stepless manner.

Further, the input device 100 according to the first embodiment uses the "feed screw mechanism" to move the range-of-motion adjuster 104. Therefore, the position of the range-of-motion adjuster 104 can be fixed even in a state in which the range-of-motion adjustment motor 105 is turned off.

(Modification of Input Device 100)

Figure 4:
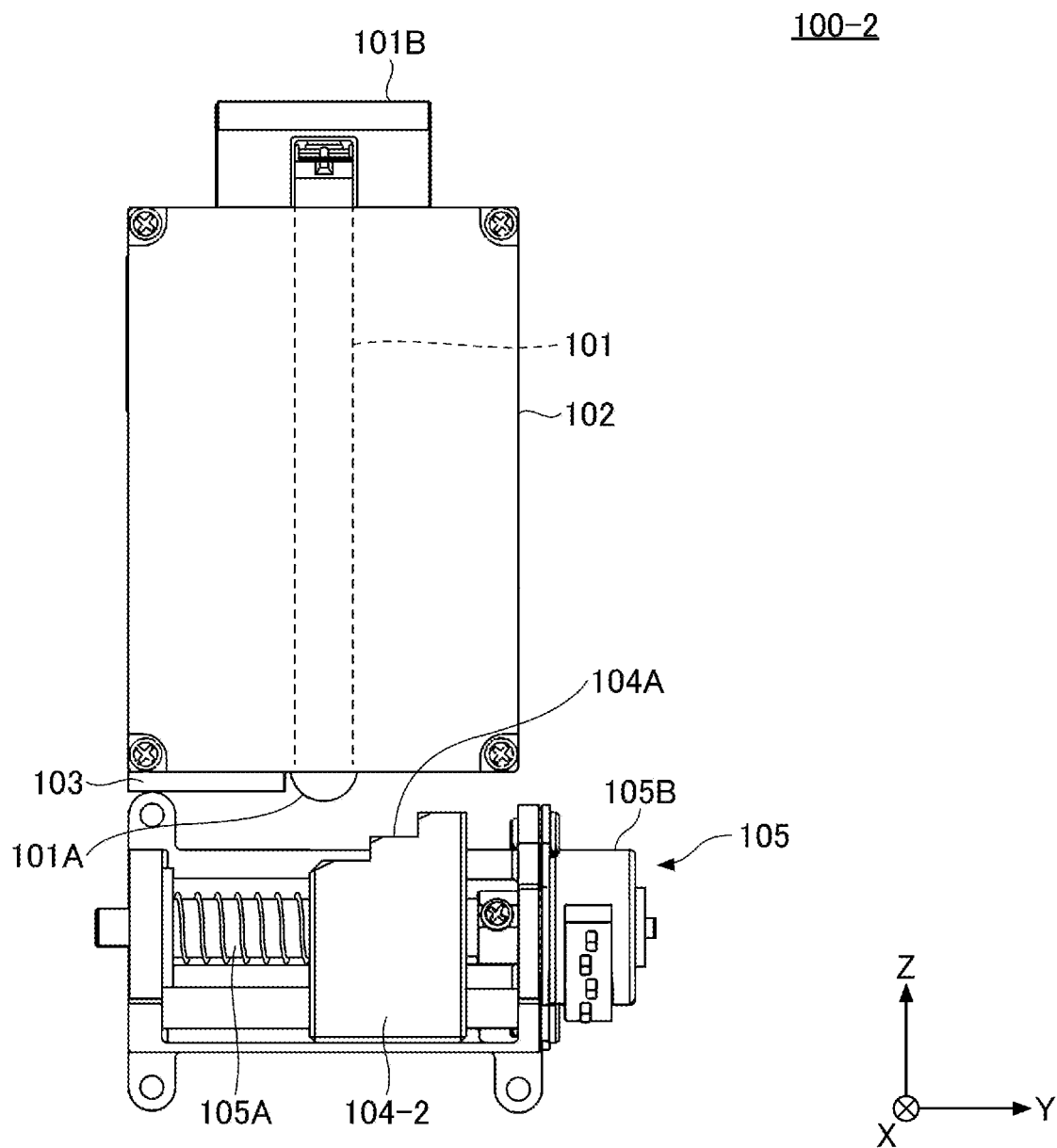
FIG. 4 is a side view illustrating a modification of the input device according to the first embodiment.

FIG. 4 is a diagram illustrating a modification of the input device 100 according to the first embodiment. An input device 100-2 illustrated in FIG. 4 differs from the input device 100 in that the input device 100-2 includes a range-of-motion adjuster 104-2 instead of the range-of-motion adjuster 104. Similar to the range-of-motion adjuster 104, the range-of-motion adjuster 104-2 is linearly movable in the left-right direction (Y-axis direction) in accordance with the rotation of the rotary shaft 105A.

The range-of-motion adjuster 104-2 has a stepped contact surface 104A. The height of the stepped contact surface 104A is lowest at the end portion on the left side and increases stepwise toward the right side. In the example illustrated in FIG. 4, the contact surface 104A has, for example, three steps.

As described, since the contact surface 104A of the input device 100-2 has the steps, a height position at which the tip portion 101A of the operation shaft 101 contacts the contact surface 104A can be changed stepwise (at three levels in the example illustrated in FIG. 4). Accordingly, the maximum push-in amount of the operation shaft 101 can be changed stepwise.

Further, the steps of the contact surface 104A of the input device 100-2 have horizontal surfaces orthogonal to the axial direction of the operation shaft 101. Therefore, even if the range-of-motion adjuster 104-2 is slightly unnecessarily moved, unwanted variations in the height position at which the tip portion 101A of the operation shaft 101 contacts the contact surface 104A can be suppressed.

Second Embodiment (Outline of Input Device 200)

Figure 5:
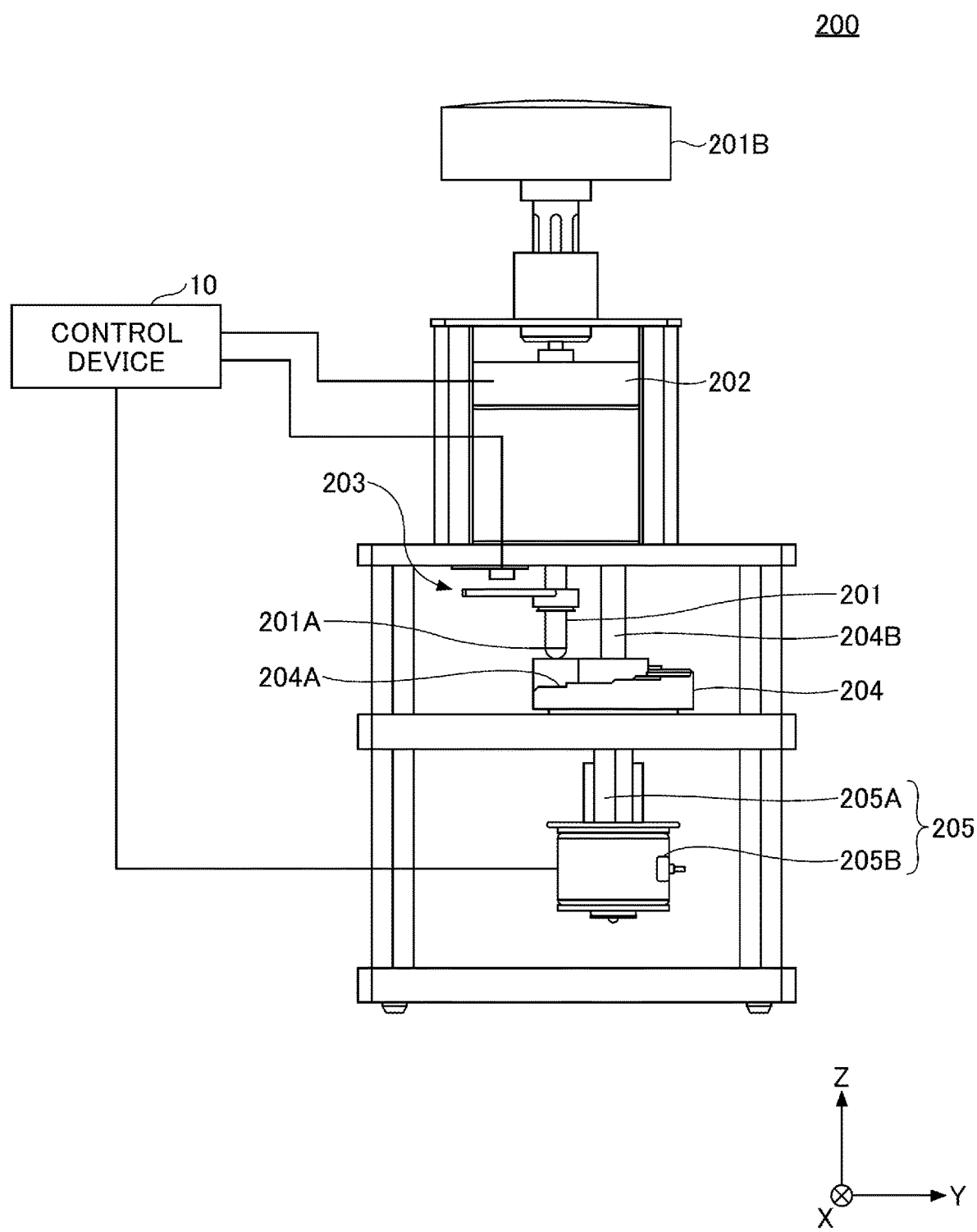
FIG. 5 is a side view of an input device according to a second embodiment.
Figure 6:
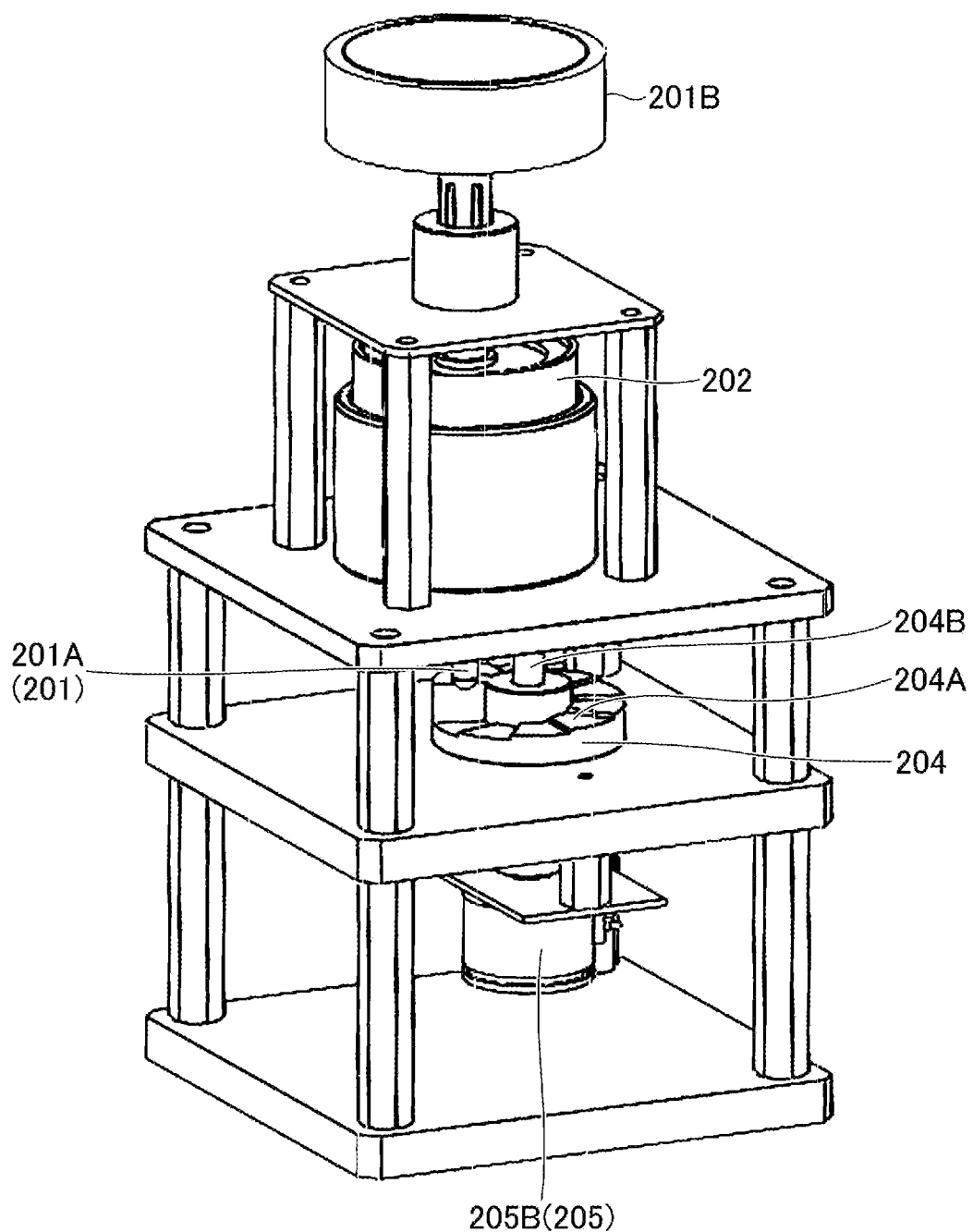
FIG. 6 is a perspective view of the exterior of the input device according to the second embodiment.

FIG. 5 is a side view of an input device 200 according to a second embodiment. FIG. 6 is a perspective view of the exterior of the input device 200 according to the second embodiment. The input device 200 illustrated in FIG. 5 and FIG. 6 is used in various types of electronic devices (for example, game controllers and the like) and is configured to be pressed. As illustrated in FIG. 5 and FIG. 6, the input device 200 includes an operation shaft 201 that extends in the upper-lower direction (Z-axis direction). An operation knob 201B is attached to the upper end portion of the operation shaft 201. The input device 200 can move the operation shaft 201 down by pressing the operation knob 201B down. The amount of downward movement of the operation shaft 201 is detected by a sensor 203, and is output from the sensor 203 to the control device 10.

As illustrated in FIG. 5 and FIG. 6, the input device 200 includes the operation shaft 201, a force sensation generator 202, the sensor 203, a range-of-motion adjuster 204, and a range-of-motion adjustment motor 205.

The operation shaft 201 is a rod-shaped member that extends in the upper-lower direction (Z-axis direction). The operation shaft 201 penetrates the inside of the force sensation generator 202. The operation shaft 201 is linearly movable within the force sensation generator 202 in the upper-lower direction (Z-axis direction). A hemispherical tip portion 201A is formed at the lower end portion (on the negative Z-axis side) of the operation shaft 201. The tip portion 201A projects downward from the lower surface of the force sensation generator 202. The upper end portion (on the positive Z-axis side) of the operation shaft 201 projects upward from the upper surface of the force sensation generator 202. The operation knob 201B is attached to the upper end portion (on the positive Z-axis side) of the operation shaft 201.

The force sensation generator 202 supports the operation shaft 201 that penetrates the force sensation generator 202 in the upper-lower direction (Z-axis direction) such that the operation shaft 201 is linearly movable in the upper-lower direction (Z-axis direction). In addition, the force sensation generator 202 is configured to apply a force to the operation shaft 201. In the second embodiment, the active-type force sensation generator 202 that can apply a driving force to the operation shaft 201 in the upper-lower direction (Z-axis direction) by electronic control is used. As the active-type force sensation generator 202, a linear motor or the like can be used, for example. However, the present invention is not limited thereto, and a passive-type force sensation generator 202 that can apply an operation load to the operation shaft 201 by electronic control may be used. As the passive force sensation generator 202, a voice coil motor or the like that uses a magnetic viscous fluid can be used.

The sensor 203 detects the amount of downward movement of the operation shaft 201. The sensor 203 outputs a detection signal indicating the detected amount of downward movement of the operation shaft 201 to the control device 10. For example, a position sensor can be used as the sensor 203.

The range-of-motion adjuster 204 is a member having a disc shape. The upper surface of the range-of-motion adjuster 204 is a contact surface 204A with which the tip portion 201A of the operation shaft 201 comes into contact. As illustrated in FIG. 5 and FIG. 6, the contact surface 204A is a stepped-spiral contact surface whose height increases counterclockwise in the circumferential direction and in a stepwise manner from the lowest position. In addition, a rotary shaft 204B having a rod shape and extending in the upper-lower direction (Z-axis direction) is provided at the center of the range-of-motion adjuster 204. With this configuration, the range-of-motion adjuster 204 is rotatable about the rotary shaft 204B. Note that the rotary shaft 204B is offset to the right side (positive Y-axis side) with respect to the operation shaft 201. Accordingly, the input device 200 according to the second embodiment can cause the tip portion 201A of the operation shaft 201 to contact the contact surface 204A.

The range-of-motion adjustment motor 205 is a device that can rotate the range-of-motion adjuster 204. The range-of-motion adjustment motor 205 includes a rotary shaft 205A having a rod shape and extending in the upper-lower direction (Z-axis direction), and a rotary drive body 205B capable of rotating the rotary shaft 205A. For example, a stepping motor is used for the rotary drive body 205B. The rotary shaft 205A is provided coaxially with the rotary shaft 204B of the range-of-motion adjuster 204 and on the lower side of the rotary shaft 204B. The rotary shaft 205A is coupled to the rotary shaft 204B. With this configuration, the range-of-motion adjustment motor 205 can rotate the range-of-motion adjuster 204 by driving the rotary drive body 205B to rotate the rotary shaft 205A.

(Examples of Operation of Input Device 200)

Figure 7:
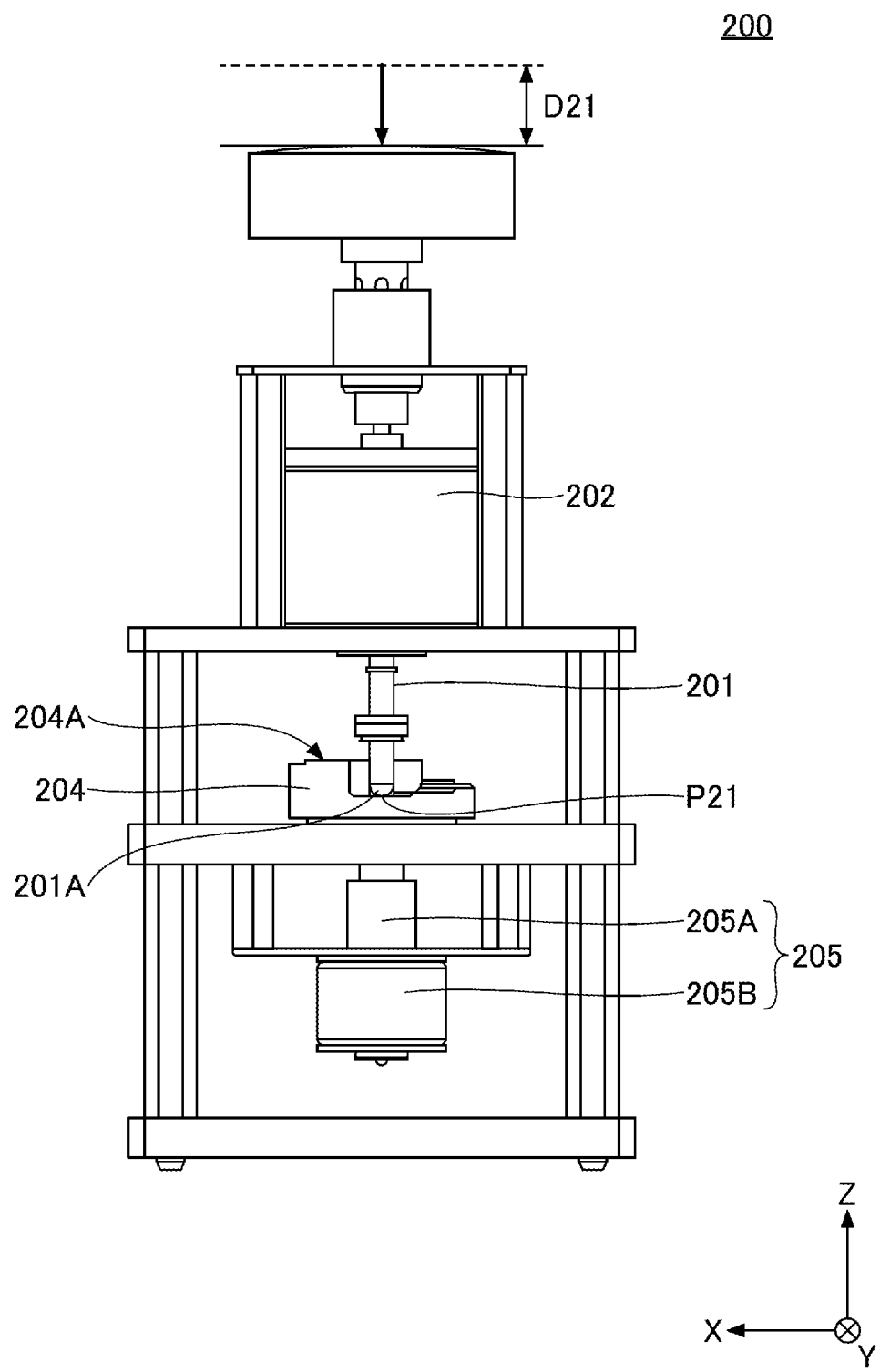
FIG. 7 is a side view illustrating a first example of the operation of the input device according to the second embodiment.
Figure 8:
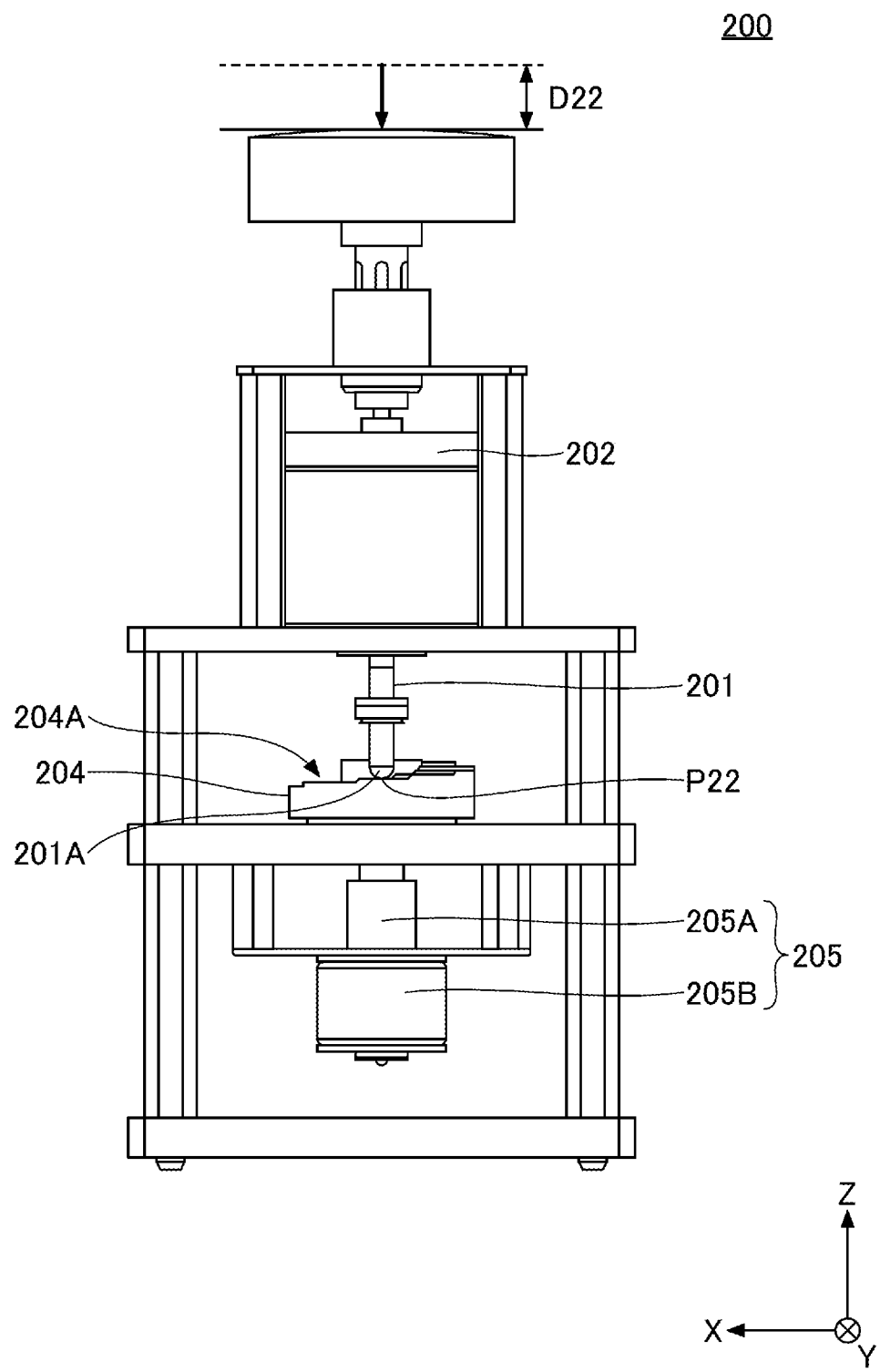
FIG. 8 is a side view illustrating a second example of the operation of the input device according to the second embodiment.
Figure 9:
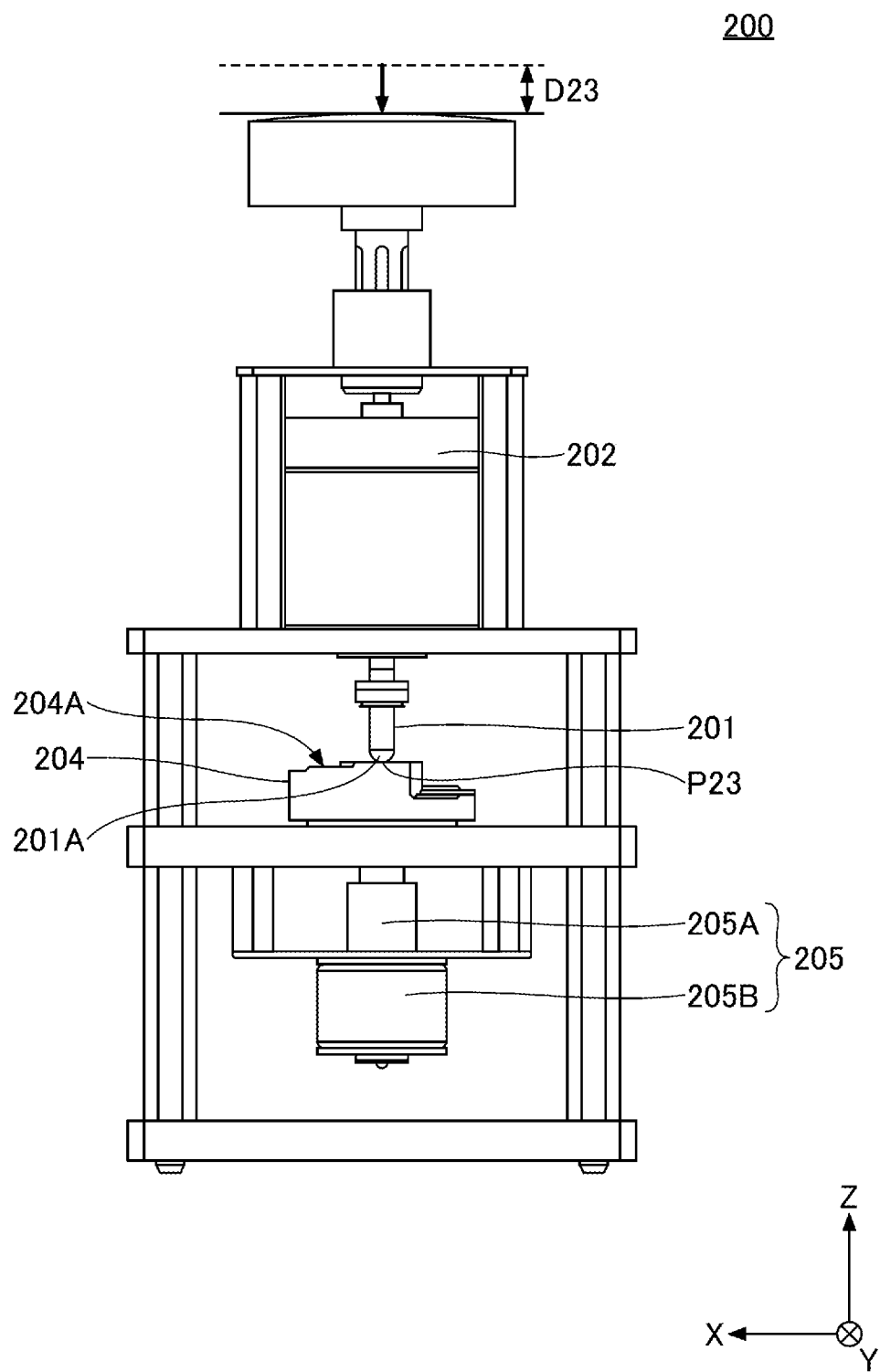
FIG. 9 is a side view illustrating a third example of the operation of the input device according to the second embodiment.

FIG. 7 is a side view illustrating a first example of the operation of the input device 200 according to the second embodiment. FIG. 8 is a side view illustrating a second example of the operation of the input device 200 according to the second embodiment. FIG. 9 is a side view illustrating a third example of the operation of the input device 200 according to the second embodiment.

In the input device 200 according to the second embodiment, upon the operation knob 201B being pressed, the operation shaft 201 is moved down. At this time, the amount of movement of the operation shaft 201 is detected by the sensor 203. In addition, at this time, the input device 200 can cause the force sensation generator 202 to apply a driving force to the operation shaft 201 in the upper-lower direction (Z-axis direction). Then, in the input device 200, the tip portion 201A of the operation shaft 201 contacts the contact surface 204A of the range-of-motion adjuster 204, thereby restricting the amount of downward movement of the operation shaft 201.

In the input device 200 according to the second embodiment, the maximum push-in position of the operation shaft 201 can be changed by rotating the range-of-motion adjuster 204.

In the example illustrated in FIG. 7, a step P21 that is the lowest portion of the contact surface 204A of the range-of-motion adjuster 204 is located directly under the tip portion 201A of the operation shaft 201. In the example illustrated in FIG. 7, the operation shaft 201 can be pushed until the tip portion 201A of the operation shaft 201 contacts the step P21 of the contact surface 204A. D21 represents the maximum push-in amount of the operation shaft 201 in this state.

In the example illustrated in FIG. 8, the range-of-motion adjuster 204 is rotated clockwise from the state illustrated in FIG. 7 by the rotary drive body 205B being driven to rotate the rotary shaft 205A clockwise. Accordingly, in the example illustrated in FIG. 8, a step P22 of the contact surface 204A of the range-of-motion adjuster 204 is located directly under the tip portion 201A of the operation shaft 201. The step P22 is positioned higher than the step P21 of FIG. 7. In the example illustrated in FIG. 8, the operation shaft 201 can be pushed until the tip portion 201A of the operation shaft 201 contacts the step P22. D22 represents the maximum push-in amount of the operation shaft 201 in this state, and is smaller than the maximum push-in amount D21 illustrated in FIG. 7.

In the example illustrated in FIG. 9, the range-of-motion adjuster 204 is rotated further clockwise from the state illustrated in FIG. 8 by the rotary drive body 205B being driven to rotate the rotary shaft 205A clockwise. Accordingly, in the example illustrated in FIG. 9, a step P23 that is the highest portion of the contact surface 204A of the range-of-motion adjuster 204 is located directly under the tip portion 201A of the operation shaft 201. In the example illustrated in FIG. 9, the operation shaft 201 can be pushed until the tip portion 201A of the operation shaft 201 contacts the step P23. D23 represents the maximum push-in amount of the operation shaft 201, and is smaller than the maximum push-in amount D22 illustrated in FIG. 8.

As described above, by controlling the rotation of the rotary shaft 205A of the range-of-motion adjustment motor 205 to change the rotation angle of the range-of-motion adjuster 204 as desired, the input device 200 according to the second embodiment can change the maximum push-in amount of the operation shaft 201 as desired. Accordingly, the input device 200 according to the second embodiment can easily and dynamically change the maximum push-in position of the operation shaft 201.

In particular, in the input device 200 according to the second embodiment, the contact surface 204A is the stepped-spiral contact surface. Therefore, a height position at which the tip portion 201A of the operation shaft 201 contacts the contact surface 204A can be changed stepwise. Thus, the maximum push-in amount of the operation shaft 201 can be changed stepwise.

Further, in the input device 200 according to the second embodiment, the steps of the contact surface 204A have horizontal surfaces orthogonal to the axial direction of the operation shaft 201. Therefore, even if the range-of-motion adjuster 204 is slightly unnecessarily moved, unwanted variations in the height position at which the tip portion 201A of the operation shaft 201 contacts the contact surface 204A can be suppressed.

(Variations of Range-of-Motion Adjuster 204)

Figure 10:
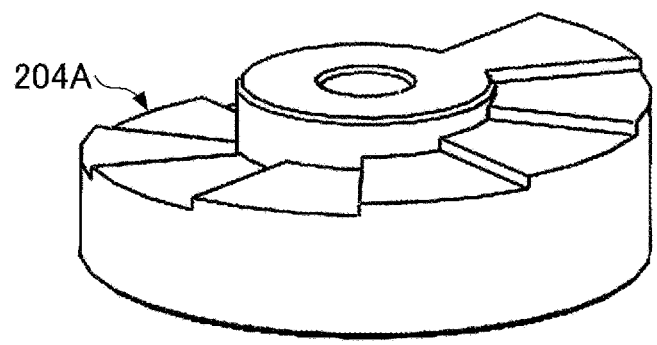
FIG. 10 is a diagram illustrating a first variation of a range-of-motion adjuster of the input device according to the second embodiment.

FIG. 10 is a diagram illustrating a first variation of the range-of-motion adjuster 204 of the input device 200 according to the second embodiment. A range-of-motion adjuster 204-1 illustrated in FIG. has a stepped-spiral contact surface 204A. Therefore, a height position at which the tip portion 201A of the operation shaft 201 contacts the contact surface 204A can be changed stepwise as the range-of-motion adjuster 204-1 rotates. Accordingly, the maximum push-in amount of the operation shaft 201 can be changed stepwise. In particular, in the range-of-motion adjuster 204-1 illustrated in FIG. 10, multiple steps of the contact surface 204A are formed at intervals of 36 degrees (°), and the height difference between two adjacent steps is 0.5 millimeters (mm). Therefore, the maximum push-in amount of the operation shaft 201 can be changed stepwise by 0.5 mm as the range-of-motion adjuster 204-1 rotates by 36°.

Figure 11:
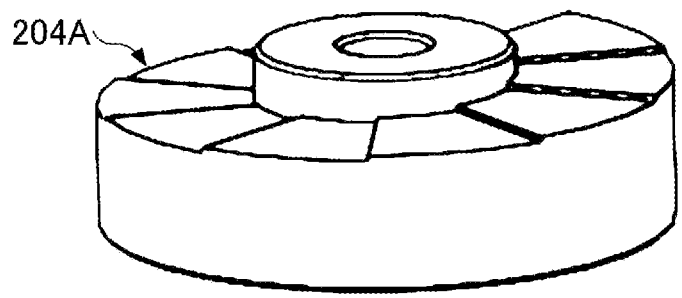
FIG. 11 is a diagram illustrating a second variation of the range-of-motion adjuster of the input device according to the second embodiment.

FIG. 11 is a diagram illustrating a second variation of the range-of-motion adjuster 204 of the input device 200 according to the second embodiment. A range-of-motion adjuster 204-2 illustrated in FIG. 11 has a stepped-spiral contact surface 204A. Therefore, a height position at which the tip portion 201A of the operation shaft 201 contacts the contact surface 204A can be changed stepwise as the range-of-motion adjuster 204-2 rotates. Accordingly, the maximum push-in amount of the operation shaft 201 can be changed stepwise. In particular, in the range-of-motion adjuster 204-2 illustrated in FIG. 11, multiple steps of the contact surface 204A are formed at intervals of 36°, and the height difference between two adjacent steps is 0.2 mm. Therefore, the maximum push-in amount of the operation shaft 201 can be changed stepwise by 0.2 mm as the range-of-motion adjuster 204-2 rotates by 36°.

Figure 12:
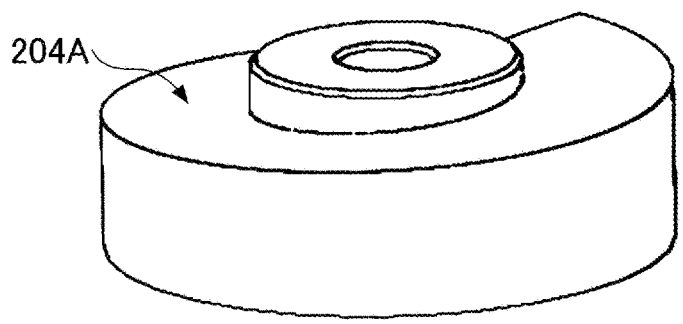
FIG. 12 is a diagram illustrating a third variation of the range-of-motion adjuster of the input device according to the second embodiment.

FIG. 12 is a diagram illustrating a third variation of the range-of-motion adjuster 204 of the input device 200 according to the second embodiment. A range-of-motion adjuster 204-3 illustrated in FIG. 12 has a spiral contact surface 204A. Therefore, a height position at which the tip portion 201A of the operation shaft 201 contacts the contact surface 204A can be changed in a stepless manner as the range-of-motion adjuster 204-3 rotates. Accordingly, the maximum push-in amount of the operation shaft 201 can be changed in a stepless manner.

Third Embodiment (Configuration of Input Device 300)

Figure 13:
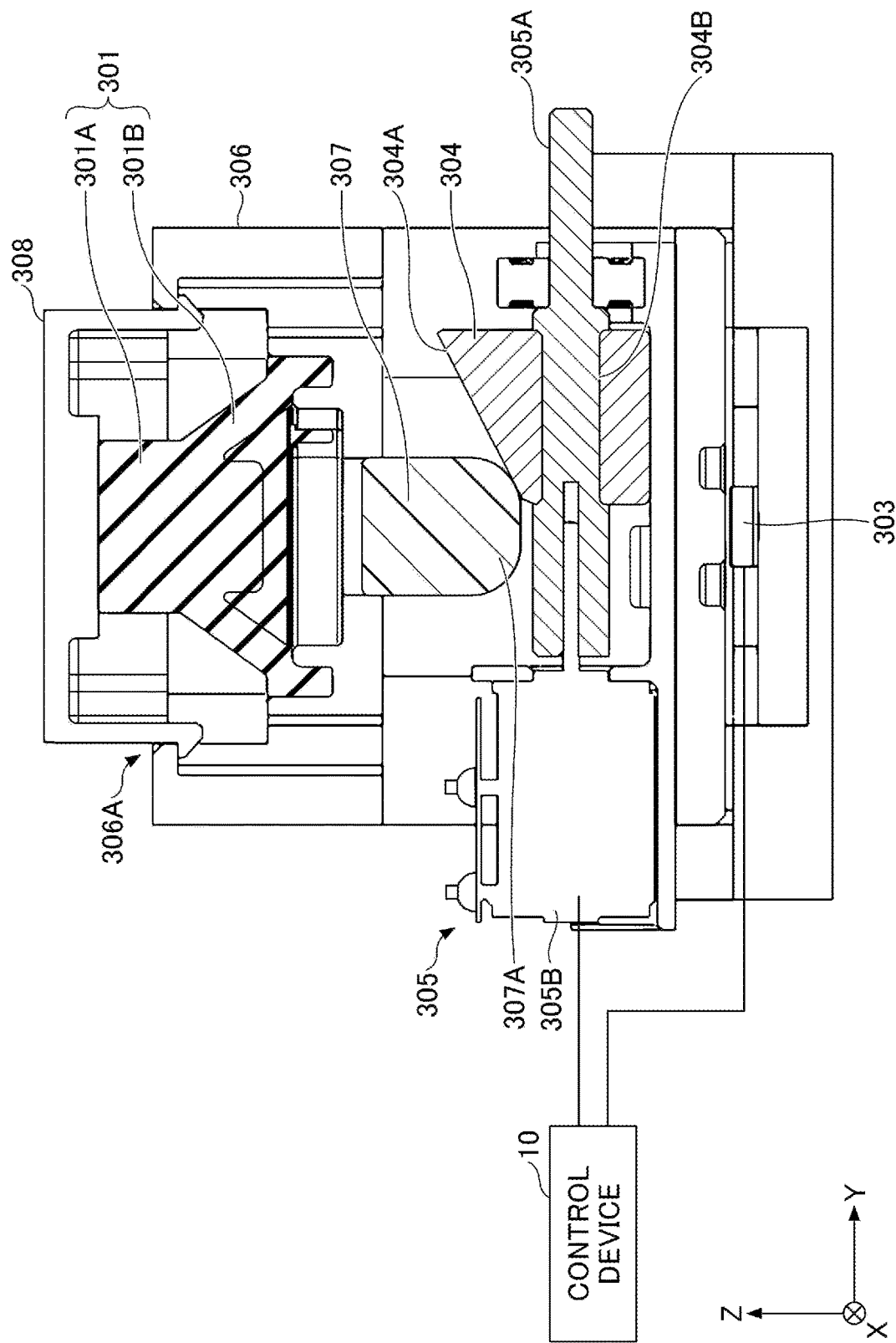
FIG. 13 is a cross-sectional view of an input device according to a third embodiment, taken along the YZ plane.

FIG. 13 is a cross-sectional view of an input device 300 according to a third embodiment, taken along the YZ plane. The input device 300 illustrated in FIG. 13 is used in various types of electronic devices (for example, game controllers and the like) and is configured to be pressed. As illustrated in FIG. 13, the input device 300 includes a rubber stem 301, and the rubber stem 301 includes a shaft portion 301A that extends in the upper-lower direction (Z-axis direction). An operation knob 308 contacts the upper end portion of the shaft portion 301A. The input device 300 can move the shaft portion 301A down by pressing the operation knob 308 down. The amount of downward movement of the shaft portion 301A is detected by a sensor 303, and is output from the sensor 303 to the control device 10.

As illustrated in FIG. 13, the input device 300 includes the rubber stem 301, the sensor 303, a range-of-motion adjuster 304, a range-of-motion adjustment motor 305, a case 306, a limiter 307, and the operation knob 308.

The operation knob 308 is a member having a circular cylindrical shape with an opening at the bottom. The operation knob 308 protrudes upward from an upper opening 306A of the case 306. The operation knob 308 is supported by the case 306 such that the operation knob 308 is linearly movable in the upper-lower direction (Z-axis direction).

The rubber stem 301 is a member made of rubber and provided on the lower side of the operation knob 308. The rubber stem 301 includes the shaft portion 301A and a skirt portion 301B. The shaft portion 301A is a member having a circular columnar shape, provided at the center of the rubber stem 301, and extending in the upper-lower direction (Z-axis direction). The shaft portion 301A is supported by the skirt portion 301B such that the shaft portion 301A is linearly movable in the upper-lower direction (Z-axis direction). The upper surface of the shaft portion 301A contacts the ceiling surface of the cylinder of the operation knob 308. The skirt portion 301B functions as a "force sensation generator". The skirt portion 301B is a skirt-shaped portion that surrounds the shaft portion 301A. The skirt portion 301B is elastically deformed so as to apply an operation load to the operation knob 308 in response to a pressing operation being performed on the operation knob 308. In addition, when a certain amount or more of an operation force is applied to the shaft portion 301A, the skirt portion 301B is inverted so as to provide a clicking sensation to an operator performing the pressing operation.

The sensor 303 detects the amount of downward movement of the shaft portion 301A. The sensor 303 outputs a detection signal indicating the detected amount of downward movement of the shaft portion 301A to the control device 10. For example, a load sensor can be used as the sensor 303.

The limiter 307 is a member having a circular columnar shape and provided on the lower side of the shaft portion 301A of the rubber stem 301. The limiter 307 is supported by the case 306 such that the limiter 307 is linearly movable in the upper-lower direction (Z-axis direction). A hemispherical tip portion 307A is formed at the lower end portion (on the negative Z-axis side) of the limiter 307.

The range-of-motion adjuster 304 is a member having a block shape. The upper surface of the range-of-motion adjuster 304 is a contact surface 304A with which the tip portion 307A of the limiter 307 comes into contact. As illustrated in FIG. 13, the contact surface 304A is an inclined surface that is inclined such that its height is lowest at the end portion on the left side (negative Y-axis side) and gradually increases toward the right side (positive Y-axis side). Further, the range-of-motion adjuster 304 has a through hole 304B that penetrates the range-of-motion adjuster 304 in the left-right direction (Y-axis direction).

The range of motion adjustment motor 305 is a device that can move the range-of-motion adjuster 304 in the left-right direction (Y-axis direction). The range of motion adjustment motor 305 includes a rotary shaft 305A having a rod shape and extending in the left-right direction (Y-axis direction), and a rotary drive body 305B capable of rotating the rotary shaft 305A. For example, a stepping motor is used for the rotary drive body 305B. The rotary shaft 305A is inserted into and disposed in the through hole 304B of the range-of-motion adjuster 304. The rotary shaft 305A and the through hole 304B constitute what is known as a "feed screw mechanism". A screw thread is formed on the outer peripheral surface of the rotary shaft 305A. Further, a screw thread is formed or a ball screw is provided on the inner peripheral surface of the through-hole 304B. Accordingly, the range of motion adjustment motor 305 can move the range-of-motion adjuster 304 in the left-right direction (Y-axis direction) by driving the rotary drive body 305B to rotate the rotary shaft 305A.

(Examples of Operation of Input Device 300)

Figure 14:
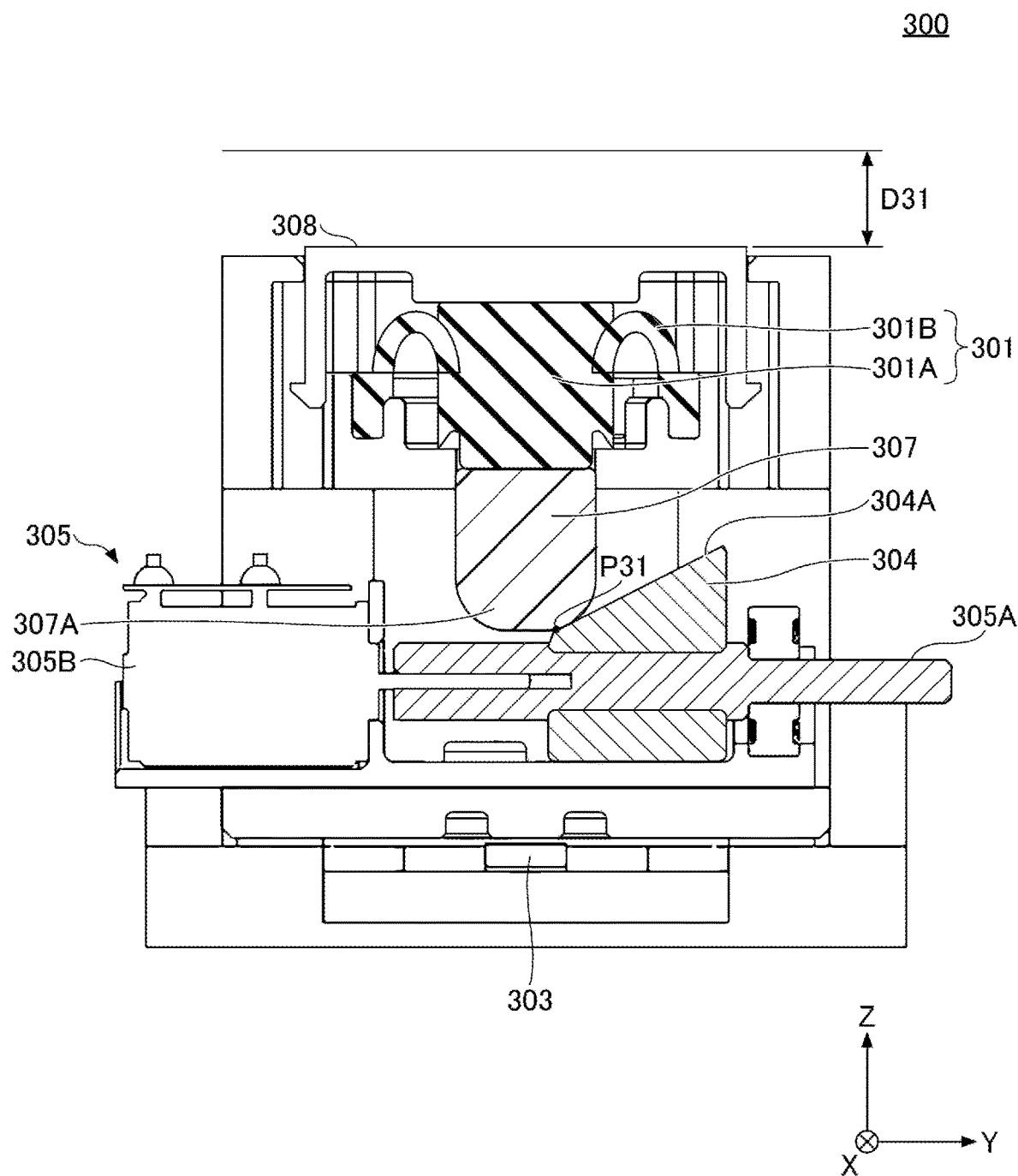
FIG. 14 is a cross-sectional view illustrating a first example of the operation of the input device according to the third embodiment.
Figure 15:
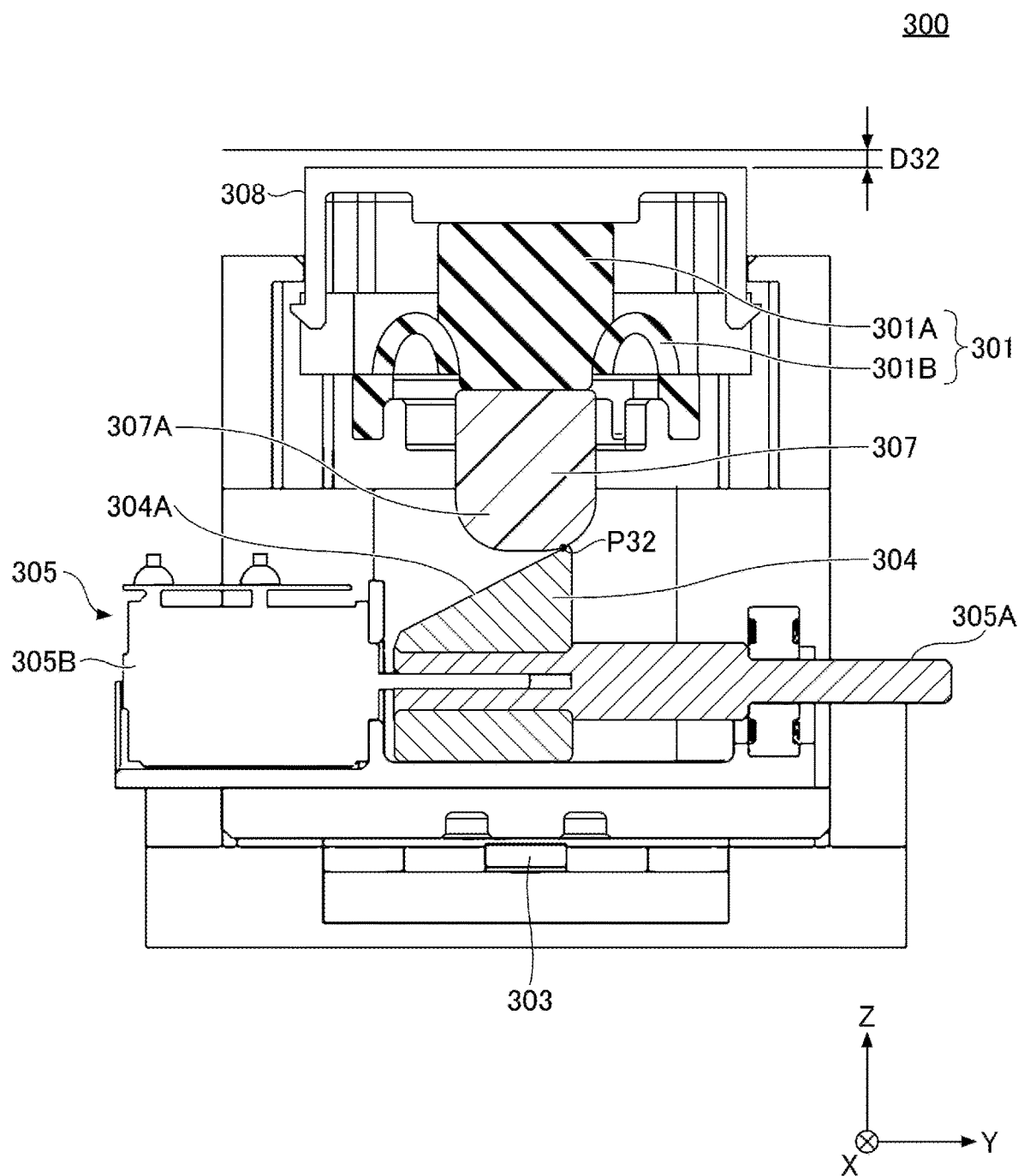
FIG. 15 is a cross-sectional view illustrating a second example of the operation of the input device according to the third embodiment.

FIG. 14 is a cross-sectional view illustrating a first example of the operation of the input device 300 according to the third embodiment. FIG. 15 is a cross-sectional view illustrating a second example of the operation of the input device 300 according to the third embodiment.

In the input device 300 according to the third embodiment, the maximum push-in position of the shaft portion 301A of the rubber stem 301 can be changed by moving the range-of-motion adjuster 304 in the left-right direction (Y-axis direction).

In the input device 300 according to the third embodiment, upon the shaft portion 301A of the rubber stem 301 being pressed, the shaft portion 301A is moved down, thereby causing the limiter 307 to be pushed down. In the input device 300, the tip portion 307A of the limiter 307 contacts the contact surface 304A of the range-of-motion adjuster 304, thereby restricting the amount of downward movement of the shaft portion 301A. In the input device 300 according to the third embodiment, the sensor 303 provided at the bottom of the case 306 is pressed, and as a result, the push-in amount of the shaft portion 301A can be detected.

In the example illustrated in FIG. 14, a contact position P31 of the contact surface 304A of the range-of-motion adjuster 304 is located directly under the tip portion 307A of the limiter 307. The contact position P31 is a left end position of the contact surface 304A and is the lowest position. In the example illustrated in FIG. 14, the shaft portion 301A can be pushed until the tip portion 307A of the limiter 307 contacts the contact position P31. D31 represents the maximum push-in amount of the shaft portion 301A in this state, which is the largest maximum push-in amount.

In the example illustrated in FIG. 15, the range-of-motion adjuster 304 is moved to the left (negative Y-axis side) from the state illustrated in FIG. 14 by the rotary drive body 305B being driven to rotate the rotary shaft 305A. Accordingly, in the example illustrated in FIG. 15, a contact position P32 of the contact surface 304A of the range-of-motion adjuster 304 is located directly under the tip portion 307A of the limiter 307. The contact position P32 is a right end position of the contact surface 304A and is the highest position. In the example illustrated in FIG. 15, the shaft portion 301A can be pushed until the tip portion 307A of the limiter 307 contacts the contact position P32. D32 represents the maximum push-in amount of the shaft portion 301A in this state, which is the smallest maximum push-in amount.

As described above, by controlling the rotation of the rotary shaft 305A of the range-of-motion adjustment motor 305 to change the position of the range-of-motion adjuster 304 in the left-right direction (Y-axis direction) as desired, the input device 300 according to the third embodiment can change the maximum push-in amount of the shaft portion 301A as desired. Accordingly, the input device 300 according to the third embodiment can easily and dynamically change the maximum push-in position of the shaft portion 301A.

In particular, in the input device 300 according to the third embodiment, the contact surface 304A is the inclined surface. Therefore, a height position at which the tip portion 307A of the limiter 307 contacts the contact surface 304A can be changed in a stepless manner. Thus, the maximum push-in amount of the shaft portion 301A can be changed in a stepless manner.

Further, the input device 300 according to the third embodiment uses the "feed screw mechanism" to move the range-of-motion adjuster 304. Therefore, the position of the range-of-motion adjuster 304 can be fixed even in a state in which the range-of-motion adjustment motor 305 is turned off.

(Modifications of Input Device 300)

Figure 16:
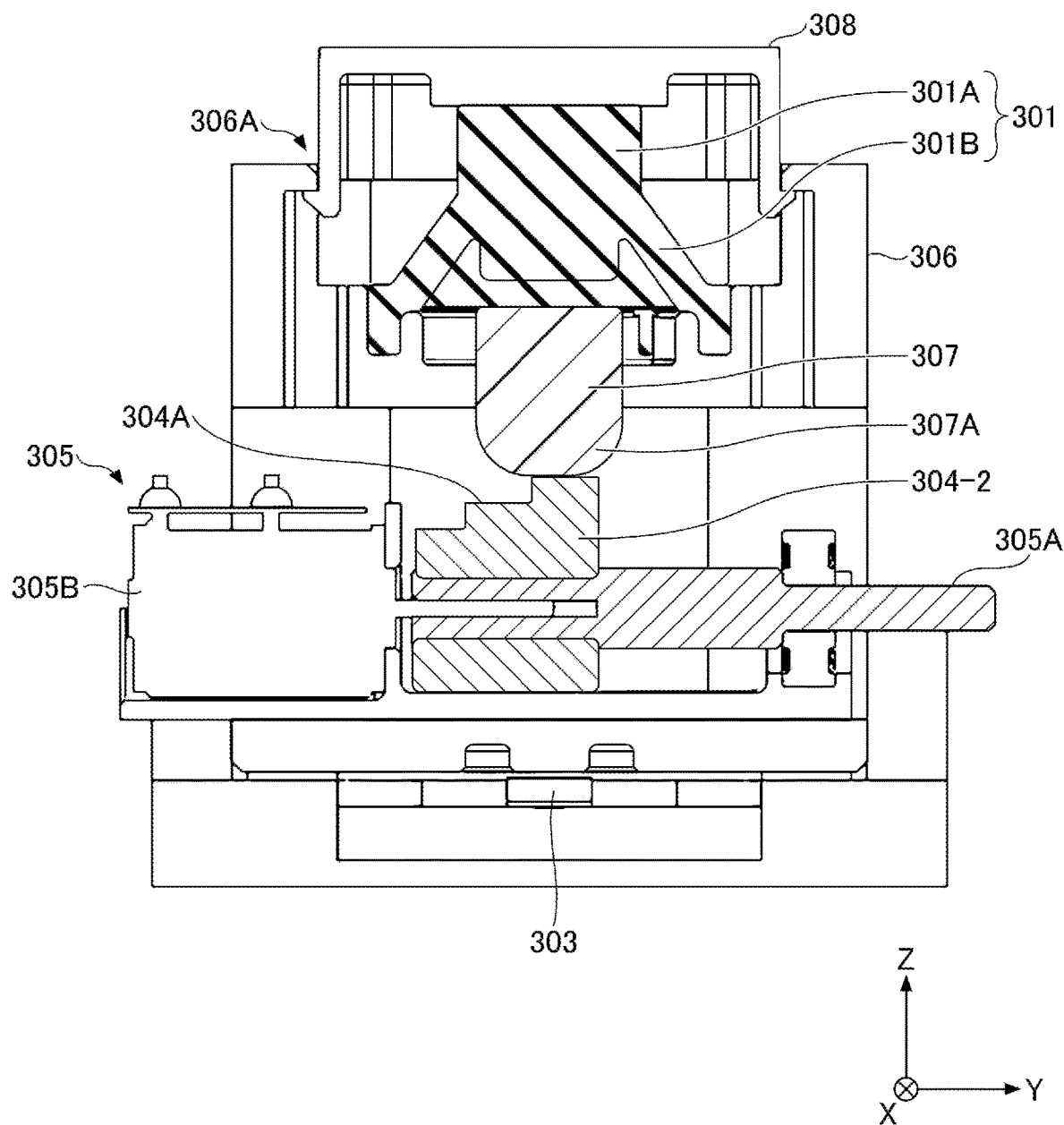
FIG. 16 is a diagram illustrating a first modification of the input device according to the third embodiment.

FIG. 16 is a diagram illustrating a first modification of the input device 300 according to the third embodiment. An input device 300-2 illustrated in FIG. 16 differs from the input device 300 in that the input device 300-2 includes a range-of-motion adjuster 304-2 instead of the range-of-motion adjuster 304. Similar to the range-of-motion adjuster 304, the range-of-motion adjuster 304-2 is linearly movable in the left-right direction (Y-axis direction) in accordance with the rotation of the rotary shaft 305A.

The range-of-motion adjuster 304-2 has a stepped contact surface 304A such that its height is lowest at the end portion on the left side and gradually increases toward the right side. In the example illustrated in FIG. 16, the contact surface 304A has, for example, three steps.

As described, since the contact surface 304A of the input device 300-2 has the steps, a height position at which the tip portion 307A of the limiter 307 contacts the contact surface 304A can be changed stepwise (at three levels in the example illustrated in FIG. 16). Accordingly, the maximum push-in amount of the shaft portion 301A can be changed stepwise.

Further, the steps of the contact surface 304A of the input device 300-2 have horizontal surfaces orthogonal to the axial direction of the shaft portion 301A. Therefore, even if the range-of-motion adjuster 304-2 is slightly unnecessarily moved, unwanted variations in the height position at which the tip portion 307A of the limiter 307 contacts the contact surface 304A can be suppressed.

Figure 17:
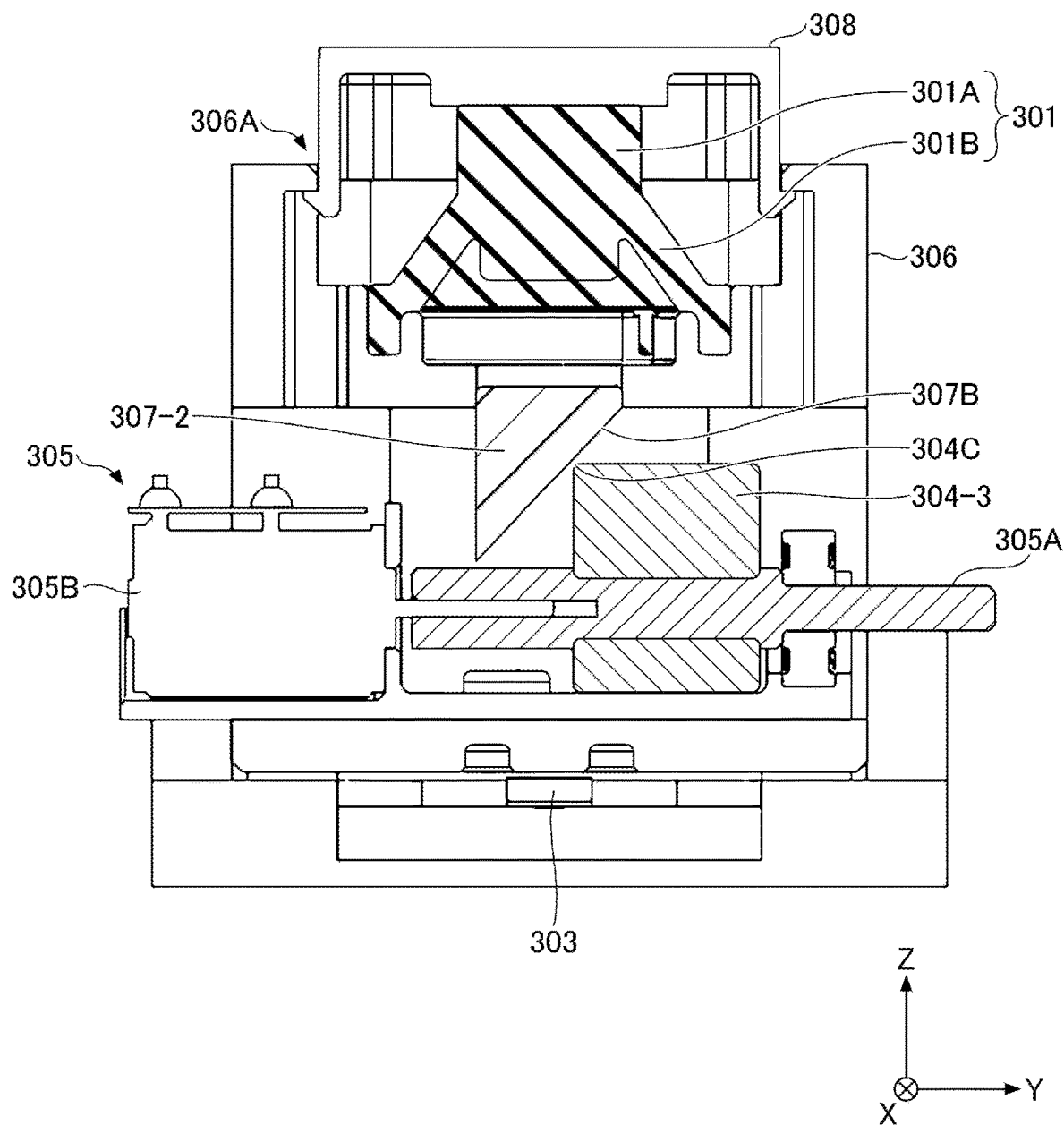
FIG. 17 is a diagram illustrating a second modification of the input device according to the third embodiment.

FIG. 17 is a diagram illustrating a second modification of the input device 300 according to the third embodiment. An input device 300-3 illustrated in FIG. 17 differs from the input device 300 in that the input device 100-3 includes a range-of-motion adjuster 304-3 instead of the range-of-motion adjuster 304 and includes a limiter 307-2 instead of the limiter 307.

Similar to the range-of-motion adjuster 304, the range-of-motion adjuster 304-3 is linearly movable in the left-right direction (Y-axis direction) in accordance with the rotation of the rotary shaft 305A. However, the upper surface of the range-of-motion adjuster 304-3 is a horizontal flat surface.

A tip portion 307A of the limiter 307-2 has an inclined surface 307B. The inclined surface 307B is inclined such that its height is lowest at the end portion on the left side and gradually increases toward the right side.

In the input device 300-3 having the above configuration, the inclined surface 307B of the tip portion 307A of the limiter 307-2 contacts a contact portion 304C, which is the left corner portion of the range-of-motion adjuster 304-3, thereby restricting the amount of downward movement of the shaft portion 301A. Accordingly, the input device 300-3 can change a height position at which the inclined surface 307B of the limiter 307-2 contacts the contact portion 304C of the range-of-motion adjuster 304-3 in a stepless manner by changing the position of the range-of-motion adjuster 304-3 in the left-right direction (Y-axis direction). Therefore, the maximum push-in amount of the shaft portion 301A can be changed in a stepless manner.

Fourth Embodiment (Configuration of Input Device 400)

Figure 18:
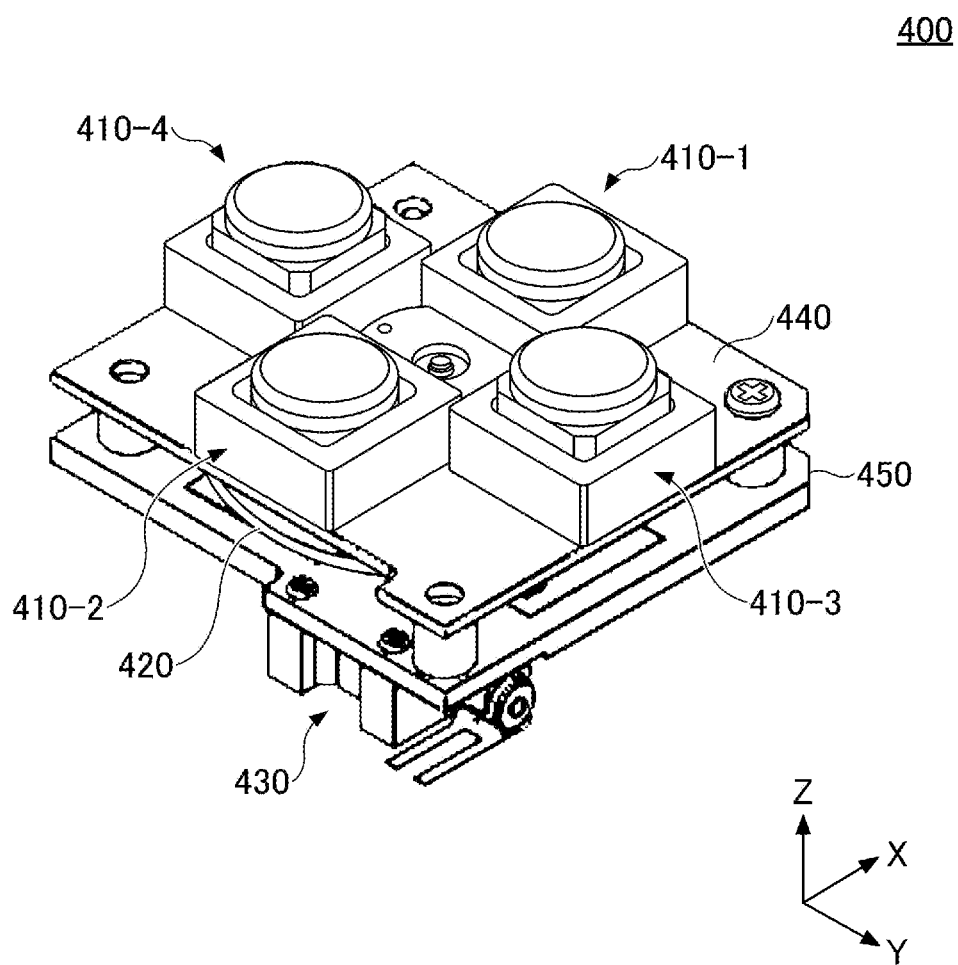
FIG. 18 is a perspective view of the exterior of an input device according to a fourth embodiment.
Figure 19:
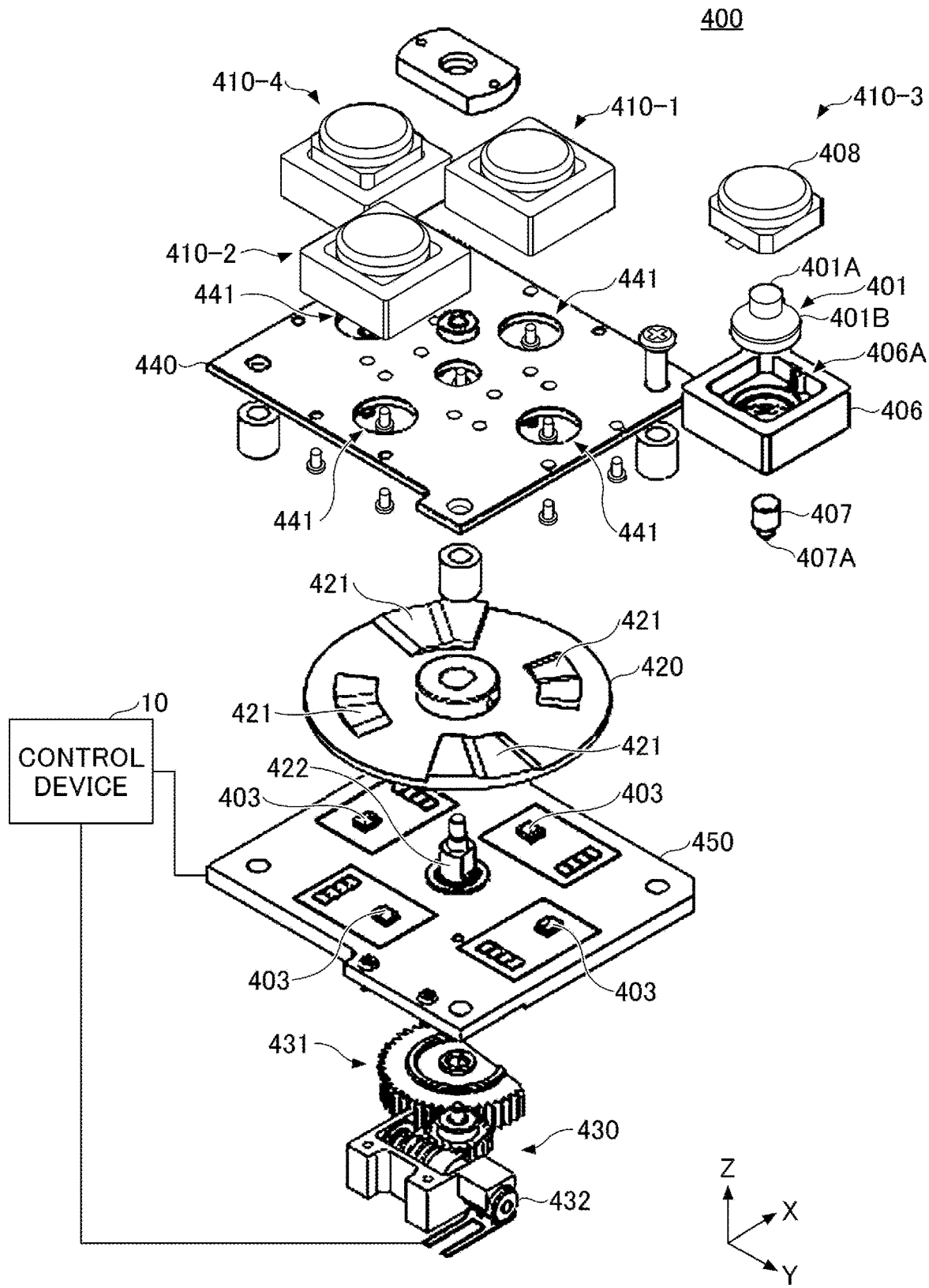
FIG. 19 is an exploded perspective view of the input device according to the fourth embodiment.
Figure 20:
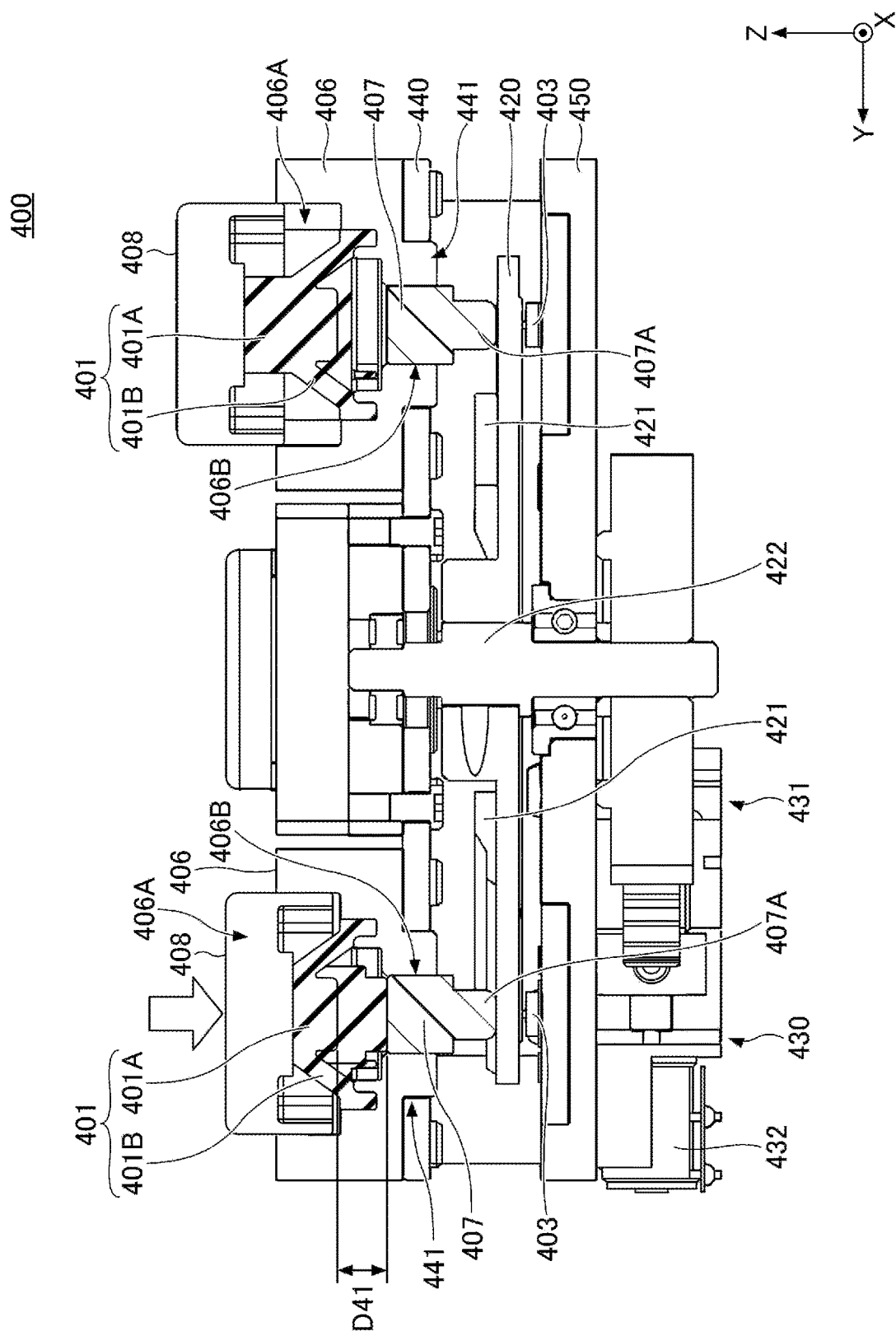
FIG. 20 is a cross-sectional view of the input device according to the fourth embodiment, taken along the YZ plane.

FIG. 18 is a perspective view of the exterior of an input device 400 according to a fourth embodiment. FIG. 19 is an exploded perspective view of the input device 400 according to the fourth embodiment. FIG. 20 is a cross-sectional view of the input device 400 according to the fourth embodiment, taken along the YZ plane.

The input device 400 illustrated in FIG. 18 through FIG. 20 is used in various types of electronic devices (for example, game controllers and the like) and is configured to be pressed. As illustrated in FIG. 18 through FIG. 20, the input device 400 includes four push buttons 410 (410-1, 410-2, 410-3, and 410-4) arranged in a cross shape. Further, the input device 400 includes a substrate 450, a range-of-motion adjuster 420, a range-of-motion adjustment motor 430, and a frame 440.

Each of the four push buttons 410 is configured to be pressed. The push button 410-1 is disposed on the front side (positive X-axis side). The push button 410-2 is disposed on the rear side (negative X-axis side). The push button 410-3 is disposed on the right side (positive Y-axis side). The push button 410-4 is disposed on the left side (negative Y-axis side).

As illustrated in FIG. 19 and FIG. 20, each of the four push buttons 410 includes a rubber stem 401, a sensor 403, a case 406, a limiter 407, and an operation knob 408.

The case 406 is a container-shaped member having a square-shaped upper opening 406A. The case 406 is fixed at a predetermined position of the upper surface of the frame 440 having a flat plate shape.

The operation knob 408 is a member having a square cylindrical shape with an opening at the bottom, and is configured to be pressed. The operation knob 408 protrudes upward from the upper opening 406A of the case 406. The operation knob 408 is supported by the case 406 such that the operation knob 408 is linearly movable in the upper-lower direction (Z-axis direction).

The rubber stem 401 is a member provided within the case 406 and on the lower side of the operation knob 408. The rubber stem 401 is made of rubber. The rubber stem 401 includes a shaft portion 401A and a skirt portion 401B. The shaft portion 401A is a member having a circular columnar shape, provided at the center of the rubber stem 401, and extending in the upper-lower direction (Z-axis direction). The shaft portion 401A is supported by the skirt portion 401B such that the shaft portion 401A is linearly movable in the upper-lower direction (Z-axis direction). The upper surface of the shaft portion 401A contacts the ceiling surface of the cylinder of the operation knob 408. The skirt portion 401B functions as a "force sensation generator". The skirt portion 401B is a skirt-shaped portion that surrounds the shaft portion 401A. The skirt portion 401B is elastically deformed so as to apply an operation load to the operation knob 408 in response to a pressing operation being performed on the operation knob 408. In addition, when a certain amount or more of an operation force is applied to the shaft portion 401A, the skirt portion 401B is inverted so as to provide a clicking sensation to an operator performing the pressing operation.

The limiter 407 is a member having a circular columnar shape and provided within a through hole 406B and on the lower side of the shaft portion 401A of the rubber stem 401. The through hole 406B is formed in the bottom portion of the case 406. The limiter 407 is supported by the through hole 406B of the case 406 such that the limiter 407 is linearly movable in the upper-lower direction (Z-axis direction). The lower end portion (on the negative Z-axis side) of the limiter 407 protrudes downward from the lower surface of the case 406, and a hemispherical tip portion 407A is formed at the lower end portion of the limiter 407.

The sensor 403 is provided on the substrate 450, and is provided under the limiter 407 with the range-of-motion adjuster 420 being interposed therebetween. The sensor 403 is pressed by the tip portion 407A of the limiter 407 via the range-of-motion adjuster 420, thereby detecting the amount of downward movement of each of the operation knob 408 and the shaft portion 401A of the rubber stem 401. The sensor 403 outputs a detection signal indicating the detected amount of movement to the control device 10. For example, a load sensor can be used as the sensor 403.

The frame 440 is a flat plate member having a square shape in a plan view. The case 406 of each of the four push buttons 410 is disposed on the upper surface of the frame 440. The frame 440 has a circular opening 441 at a position where the case 406 of each of the four push buttons 410 is disposed. By fitting the bottom portion of the case 406 into the opening 441, the case 406 can be positioned. Further, by inserting the tip portion 407A of the limiter 407 into the opening 441, the tip portion 407A can protrude downward from the frame 440.

The substrate 450 is a flat plate member having a square shape in a plan view. The substrate 450 is provided under the frame 440 with the range-of-motion adjuster 420 being interposed therebetween. The sensor 403 of each of the four push buttons 410 is disposed on the upper surface of the substrate 450.

The range-of-motion adjuster 420 is a member having a disc shape and provided under the frame 440. Four contact portions 421 are provided on the upper surface and on the same circumference of the range-of-motion adjuster 420 at respective positions under four limiters 407. Tip portions 407A of the four limiters 407 contact the respective four contact portions 421. Each of the four contact portions 421 is a stepped portion whose height increases clockwise in the circumferential direction and in a stepwise manner from the lowest position. Further, a rotary shaft 422 having a rod shape and extending in the upper-lower direction (Z-axis direction) is disposed at the center of the range-of-motion adjuster 420. With this configuration, the range-of-motion adjuster 420 is rotatable about the rotary shaft 422. By rotating the range-of-motion adjuster 420, the contact positions of the tip portions 407A of the four limiters 407 with respect to the four contact portions 421 can be changed in the upper-lower direction (Z-axis direction).

In particular, the four contact portions 421 have the same shape such that the contact positions of the four limiters 407 are at the same height. Accordingly, the input device 400 according to the fourth embodiment can cause the maximum push-in positions of the four push buttons 410 to be the same, and can collectively change the maximum push-in positions of the four push buttons 410. Note that the contact positions of the four limiters 407 can be at different heights such that the maximum push-in positions of the four push buttons 410 can be different from one another. Further, the contact positions of two limiters 407 can be at the same height such that the maximum push-in positions of corresponding two push buttons 410 can be the same. Further, the shapes of steps and slopes of the range-of-motion adjuster 420 are not limited to the shapes illustrated in FIG. 19.

The range-of-motion adjustment motor 430 is a device that can rotate the range-of-motion adjuster 420. The range-of-motion adjustment motor 430 includes a gear group 431 and a rotary drive body 432 capable of rotating the gear group 431. For example, a stepping motor is used for the rotary drive body 432. The gear group 431 couples a rotary shaft of the rotary drive body 432 to the rotary shaft 422. With this configuration, the range-of-motion adjustment motor 430 can rotate the range-of-motion adjuster 420 by driving the rotary drive body 432 to rotate the gear group 431.

In the input device 400 according to the fourth embodiment, upon a given shaft portion 401A of four shaft portions 401A of rubber stems 401 being pressed, the given shaft portion 401A is moved down, thereby causing a corresponding limiter 407 to be pushed down. Then, in the input device 400, a tip portion 407A of the limiter 407 contacts a corresponding contact portion 421 of the range-of-motion adjuster 420, thereby restricting the amount of downward movement of the given shaft portion 401A. In the input device 400 according to the fourth embodiment, a corresponding sensor 403 provided on the upper surface of the substrate 450 is pressed, and as a result, the push-in load of the given shaft portion 401A can be detected.

Further, the input device 400 according to the fourth embodiment can collectively change the maximum push-in positions of the four shaft portions 401A by rotating the range-of-motion adjuster 420.

In the state illustrated in FIG. 20, the contact portions 421 are not located directly under the tip portions 407A of the limiters 407. Therefore, in the example illustrated in FIG. 20, each of the four shaft portions 401A can be pressed until each of the tip portions 407A of the four limiters 407 contacts the upper surface of the range-of-motion adjuster 420. D41 represents the maximum push-in amount of each of the four shaft portions 401A in this state.

The input device 400 according to the fourth embodiment can cause the range-of-motion adjuster 420 in the state illustrated in FIG. 20 to rotate counterclockwise by driving the rotary drive body 432 to rotate the rotary shaft 422 counterclockwise.

Accordingly, the input device 400 according to the fourth embodiment can position steps (the first steps or the second steps) of the stepped contact portions 421 directly under the tip portions 407A of the four limiters 407. The first steps of the contact portions 421 are positioned higher than the upper surface of the range-of-motion adjuster 420. The second steps of the contact portions 421 are positioned higher than the first steps of the contact portions 421.

For example, by positioning the first steps of the contact portions 421 directly under the tip portions 407A of the four limiters 407, the maximum push-in amounts of the four shaft portions 401A can be made smaller than D41. For example, by positioning the second steps of the contact portions 421 directly under the tip portions 407A of the four limiters 407, the maximum push-in amounts of the four shaft portions 401A can be made even smaller.

As described above, by controlling the rotation of the rotary shaft of the range-of-motion adjustment motor 430 to change the rotation angle of the range-of-motion adjuster 420 as desired, the input device 400 according to the fourth embodiment can collectively change the maximum push-in amounts of the four shaft portions 401A as desired. Accordingly, the input device 400 according to the fourth embodiment can easily and dynamically change the maximum push-in positions of the four shaft portions 401A.

In particular, the input device 400 according to the fourth embodiment includes the stepped contact portions 421. Therefore, height positions at which the tip portions 407A of the four limiters 407 contact the stepped contact portions 421 can be changed stepwise. Thus, the maximum push-in amounts of the four shaft portions 401A can be correctively changed stepwise.

(Examples of Load Characteristics)

Figure 21:
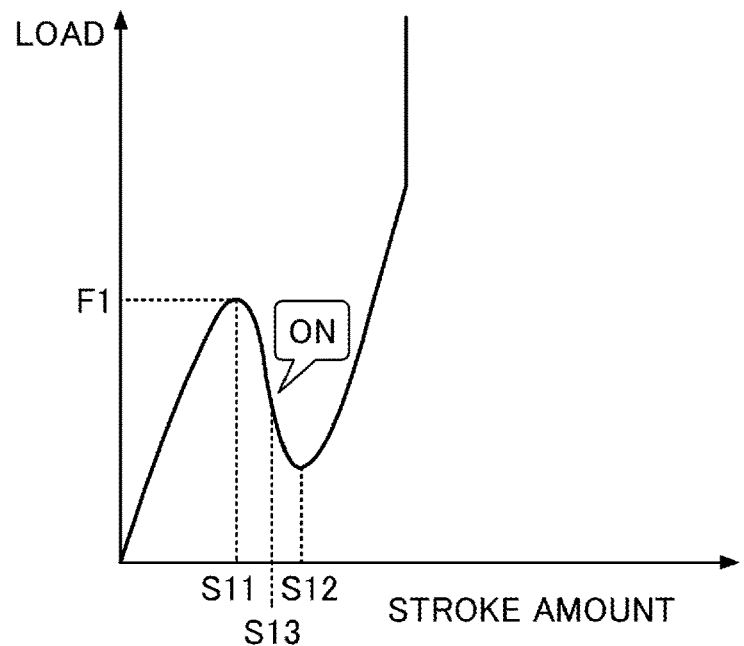
FIG. 21 is a graph illustrating a first example of load characteristics that can be applied to each of the input devices according to the embodiments.
Figure 22:
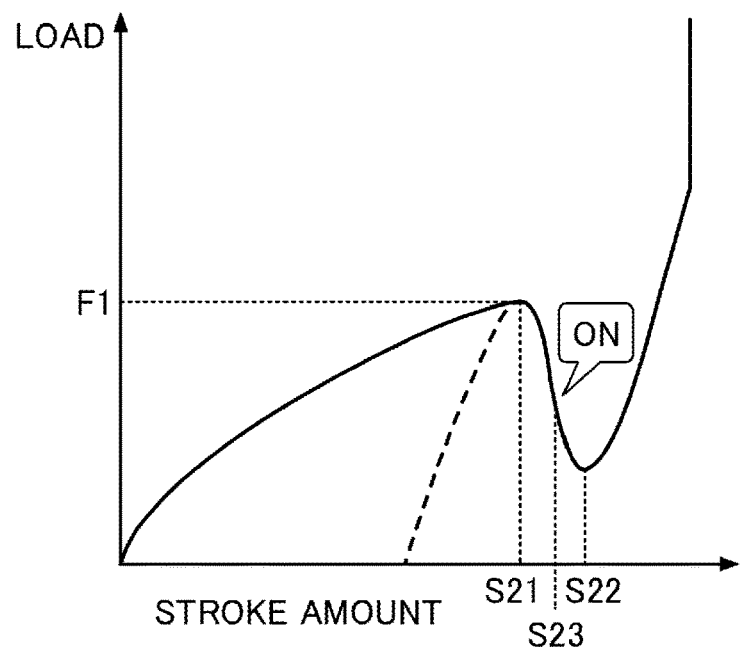
FIG. 22 is a graph illustrating a second example of load characteristics that can be applied to each of the input devices according to the embodiments.
Figure 23:
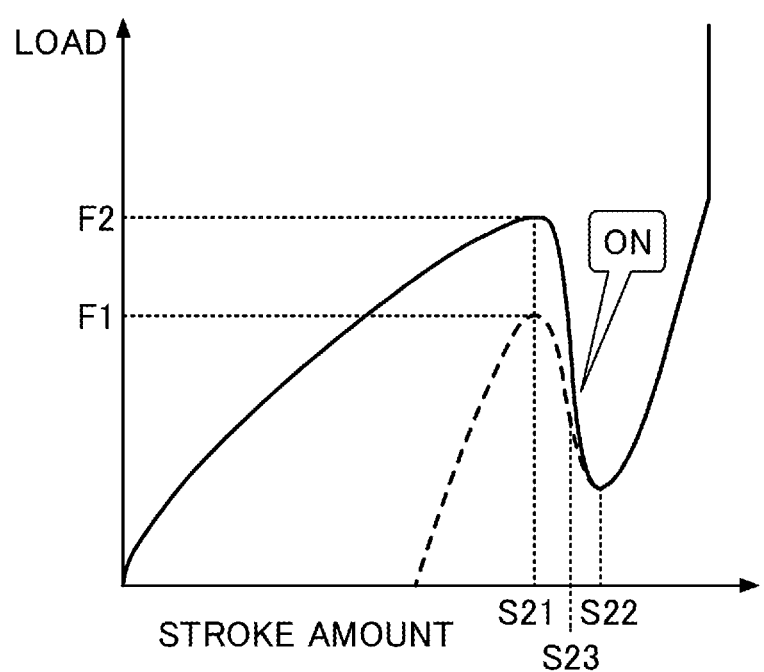
FIG. 23 is a graph illustrating a third example of load characteristics that can be applied to each of the input devices according to the embodiments.

FIG. 21 is a graph illustrating a first example of load characteristics of a pressing operation, which can be applied to each of the input devices according to the embodiments. FIG. 22 is a graph illustrating a second example of load characteristics of a pressing operation, which can be applied to each of the input devices according to the embodiments. FIG. 23 is a graph illustrating a third example of load characteristics of a pressing operation, which can be applied to each of the input devices according to the embodiments.

In the load characteristics illustrated in FIG. 21, the control device 10 controls each of the force sensation generators via software, such that an operation load gradually increases in accordance with an increase in the stroke amount of an operation shaft until the stroke amount of the operation shaft reaches S11 (a first predetermined amount). Then, upon the stroke amount of the operation shaft reaching S11, the operation load decreases in accordance with an increase in the stroke amount of the operation shaft until the stroke amount of the operation shaft reaches S12 (a second predetermined amount). Then, upon the stroke amount of the operation shaft reaching S12 (the second predetermined amount), the operation load gradually increases in accordance with an increase in the stroke amount of the operation shaft.

In the example illustrated in FIG. 21, the control device 10 determines that the operation shaft is in the on-position when the stroke amount of the operation shaft is a predetermined amount S13 between S11 and S12.

Further, in the load characteristics illustrated in in each of FIG. 22 and FIG. 23, the control device 10 controls each of the force sensation generators via software, such that an operation load gradually increases in accordance with an increase in the stroke amount of an operation shaft until the stroke amount of the operation shaft reaches S21 (a first predetermined amount) (provided that S21>S11, i.e., where S21 is greater than S11). Then, upon the stroke amount of the operation shaft reaching S21, the operation load decreases in accordance with an increase in the stroke amount of the operation shaft until the stroke amount of the operation shaft reaches S22 (a second predetermined amount). Then, upon the stroke amount of the operation shaft reaching S22 (the second predetermined amount), the operation load gradually increases in accordance with an increase in the stroke amount of the operation shaft.

In each of the examples illustrated in FIG. 22 and FIG. 23, the control device 10 determines that the operation shaft is in the on-position when the stroke amount of the operation shaft is a predetermined amount S23 between S21 and S22.

In the example illustrated in FIG. 21, the load when the stroke amount reaches S11 is F1. In the example illustrated in FIG. 22, the load when the stroke amount reaches S21 is F1. In the example illustrated in FIG. 23, the load when the stroke amount reaches S21 is F2 (provided that F2>F1, i.e., where F2 is greater than F1).

Further, in the load characteristics illustrated in each of FIG. 21 through FIG. 23, the operation load is the maximum value when the operation shaft is in the maximum stroke position.

As described, each of the input devices according to the embodiments can change load characteristics of a pressing operation of the operation shaft as desired by causing the control device 10 to control the operation of each of the force sensation generators via software (except when a rubber stem is used).

Load characteristics when the stroke amount is greater than or equal to S11 in the example illustrated in FIG. 21 are the same as load characteristics when the stroke amount is greater than or equal to S21 in the example illustrated in FIG. 22. Accordingly, even when the stroke amount of the operation shaft is changed, the control device 10 does not change an operation sensation when the stroke amount of the operation shaft is near the maximum amount.

(Example of Method of Detecting Maximum Push-In Amount)

Figure 24:
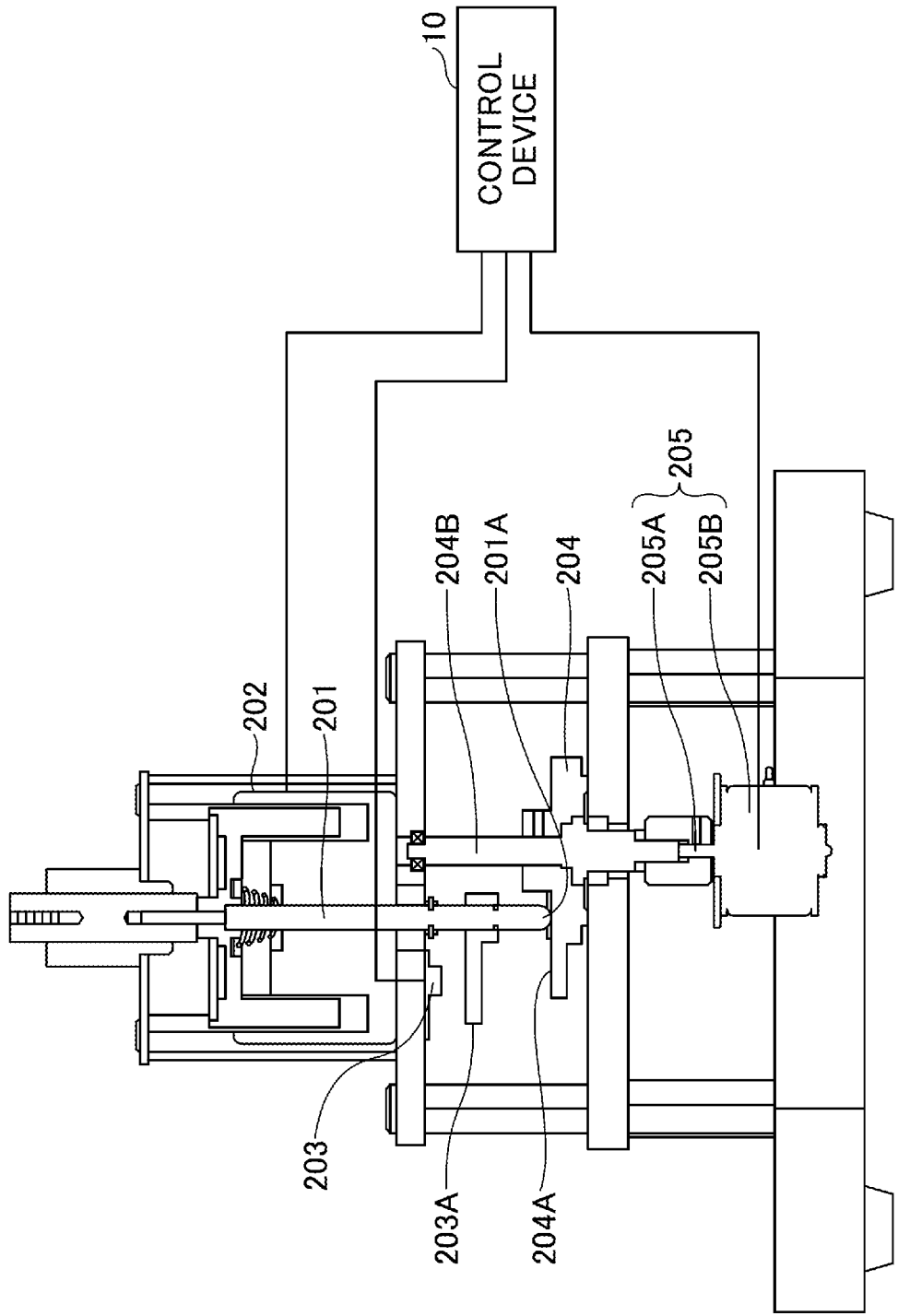
FIG. 24 is a diagram illustrating an example of a method of detecting the maximum push-in amount by the input device according to the second embodiment.

FIG. 24 is a diagram illustrating an example of a method of detecting the maximum push-in amount by the input device 200 according to the second embodiment. In the example illustrated in FIG. 24, a stroke sensor is provided as the sensor 203 of the input device 200 according to the second embodiment. The sensor 203 can detect the stroke amount of the operation shaft 201 by detecting the position of a reflector 203A attached to the operation shaft 201.

In the example illustrated in FIG. 24, the control device 10 operates the range-of-motion adjustment motor 205 to rotate the range-of-motion adjuster 204. Subsequently, the control device 10 operates the force sensation generator 202 to move the operation shaft 201 down such that the tip portion 201A of the operation shaft 201 contacts the contact surface 204A of the range-of-motion adjuster 204. At this time, the control device 10 can detect the maximum push-in amount by using the sensor 203, which is capable of detecting the stroke amount of the operation shaft 201, to detect the stroke amount of the operation shaft 201. Accordingly, the control device 10 can detect the maximum push-in amount of the operation shaft 201 without using a sensor that detects the rotation angle of the range-of-motion adjuster 204.

Further, in the example illustrated in FIG. 24, the control device 10 can detect the initial value of the maximum push-in amount of the operation shaft 201 by using the sensor 203 as described above when the power is turned on. Thereafter, based on the initial value and the control amount of the rotary drive body 205B, the control device 10 can detect the latest value of the maximum push-in amount of the operation shaft 201 by calculating the rotation angle of the range-of-motion adjuster 204 from when the power is turned on. Accordingly, the control device 10 can detect the initial value of the maximum push-in amount of the operation shaft 201 by using the sensor 203 only when the power is turned on, and can thereafter detect the latest value of the maximum push-in amount of the operation shaft 201 without using the sensor 203.

According to an embodiment of the present disclosure, the maximum push-in position of an operation shaft of an input device can be easily and dynamically changed.

Although the embodiments have been specifically described above, the present invention is not limited to the specific embodiments and various modifications and variations may be made without departing from the scope of the present invention.

What is claimed is:

1. An input device comprising:
    an operation shaft extending in a first direction, linearly movable in the first direction, and having a tip portion;
    a force sensation generator configured to apply a force to the operation shaft;
    a sensor configured to detect an amount of movement of the operation shaft;
    a range-of-motion adjuster configured to change a maximum push-in position of the operation shaft; and
    a range-of-motion adjustment motor configured to operate the range-of-motion adjuster,
    wherein the range-of-motion adjuster has a contact portion with which the tip portion of the operation shaft comes into contact, and
    the range-of-motion adjuster changes the maximum push-in position of the operation shaft by being operated to change a contact position of the tip portion with respect to the contact portion in the first direction,
    wherein the contact portion is an inclined contact surface or a stepped contact surface,
        the range-of-motion adjustment motor includes a rotary shaft whose axial direction is a second direction that is orthogonal to the first direction,
        the range-of-motion adjuster has a through hole that penetrates the range-of-motion adjuster in the second direction and into which the rotary shaft is inserted, and
        the range-of-motion adjuster linearly moves in the second direction in accordance with rotation of the rotary shaft so as to change the contact position of the tip portion with respect to the inclined contact surface in the first direction.

2. The input device according to claim 1, wherein the tip portion of the operation shaft directly contacts the inclined contact surface.

3. The input device according to claim 1, wherein the operation shaft includes a limiter,
    the limiter is provided at a position corresponding to the range-of-motion adjuster, is linearly movable in the first direction, and has a tip portion, and
    the tip portion of the limiter contacts the inclined contact surface.

4. The input device according to claim 1, wherein the force sensation generator is a passive force sensation generator configured to apply an operation load to the operation shaft.

5. The input device according to claim 1, wherein the force sensation generator is an active force sensation generator configured to move the operation shaft in the first direction.

6. The input device according to claim 1, wherein the sensor is a load sensor configured to detect a load for pushing the operation shaft.

7. An input device comprising:
    an operation shaft extending in a first direction, linearly movable in the first direction, and having a tip portion;
    a force sensation generator configured to apply a force to the operation shaft;
    a sensor configured to detect an amount of movement of the operation shaft;
    a range-of-motion adjuster configured to change a maximum push-in position of the operation shaft; and
    a range-of-motion adjustment motor configured to operate the range-of-motion adjuster,
    wherein the range-of-motion adjuster has a contact portion with which the tip portion of the operation shaft comes into contact, and
    the range-of-motion adjuster changes the maximum push-in position of the operation shaft by being operated to change a contact position of the tip portion with respect to the contact portion in the first direction,
    wherein the contact portion is a spiral contact surface or a stepped-spiral contact surface, and
    the range-of-motion adjuster includes a rotary shaft whose axial direction is the first direction, and the range-of-motion adjuster rotates about the rotary shaft so as to change the contact position of the tip portion with respect to the spiral contact surface in the first direction.

8. The input device according to claim 7, wherein the operation shaft includes a plurality of operation shafts,
    the range-of-motion adjuster includes a plurality of inclined or stepped contact portions with which respective tip portions of the plurality of operation shafts come into contact, and
    the range-of-motion adjuster includes a rotary shaft whose axial direction is the first direction, and the range-of-motion adjuster rotates about the rotary shaft so as to change contact positions of the respective tip portions of the plurality of operation shafts with respect to the plurality of inclined or stepped contact portions in the first direction.

9. The input device according to claim 8, wherein the plurality of operation shafts are arranged concentrically around the rotary shaft of the range-of-motion adjuster, and
    the plurality of inclined or stepped contact portions have a same shape such that the contact positions of the respective tip portions of the plurality of operation shafts with respect to the plurality of inclined or stepped contact portions are at a same height in the first direction.

10. The input device according to claim 9, wherein a number of the plurality of operation shafts is four, and a number of the plurality of inclined or stepped contact portions is four.

11. An input device comprising:
    an operation shaft extending in a first direction, linearly movable in the first direction, and having a tip portion;
    a force sensation generator configured to apply a force to the operation shaft;

a sensor configured to detect an amount of movement of the operation shaft;
a range-of-motion adjuster configured to change a maximum push-in position of the operation shaft; and
a range-of-motion adjustment motor configured to operate the range-of-motion adjuster,
wherein the range-of-motion adjuster has a contact portion with which the tip portion of the operation shaft comes into contact, and
the range-of-motion adjuster changes the maximum push-in position of the operation shaft by being operated to change a contact position of the tip portion with respect to the contact portion in the first direction, wherein the operation shaft includes a limiter,
the limiter is provided at a position corresponding to the range-of-motion adjuster, is linearly movable in the first direction, and has an inclined surface at a tip portion thereof,
the range-of-motion adjustment motor includes a rotary shaft whose axial direction is a second direction that is orthogonal to the first direction,
the range-of-motion adjuster has a through hole that penetrates the range-of-motion adjuster in the second direction and into which the rotary shaft is inserted, and
the range-of-motion adjuster linearly moves in the second direction in accordance with rotation of the rotary shaft so as to change a contact position of the inclined surface of the limiter with respect to the contact portion of the range-of-motion adjuster in the first direction.

12. An input device comprising:
an operation shaft extending in a first direction, linearly movable in the first direction, and having a tip portion;
a force sensation generator configured to apply a force to the operation shaft;
a sensor configured to detect an amount of movement of the operation shaft;
a range-of-motion adjuster configured to change a maximum push-in position of the operation shaft; and
a range-of-motion adjustment motor configured to operate the range-of-motion adjuster,
wherein the range-of-motion adjuster has a contact portion with which the tip portion of the operation shaft comes into contact, and
the range-of-motion adjuster changes the maximum push-in position of the operation shaft by being operated to change a contact position of the tip portion with respect to the contact portion in the first direction,
wherein the force sensation generator is a passive force sensation generator configured to apply an operation load to the operation shaft, and
wherein the passive force sensation generator uses a magnetic viscous fluid.

13. An input device comprising:
an operation shaft extending in a first direction, linearly movable in the first direction, and having a tip portion;
a force sensation generator configured to apply a force to the operation shaft;
a sensor configured to detect an amount of movement of the operation shaft;
a range-of-motion adjuster configured to change a maximum push-in position of the operation shaft; and
a range-of-motion adjustment motor configured to operate the range-of-motion adjuster,
wherein the range-of-motion adjuster has a contact portion with which the tip portion of the operation shaft comes into contact, and
the range-of-motion adjuster changes the maximum push-in position of the operation shaft by being operated to change a contact position of the tip portion with respect to the contact portion in the first direction,
wherein the force sensation generator is an active force sensation generator configured to move the operation shaft in the first direction, and
wherein the force sensation generator is a linear motor.

14. An input device comprising:
an operation shaft extending in a first direction, linearly movable in the first direction, and having a tip portion;
a force sensation generator configured to apply a force to the operation shaft;
a sensor configured to detect an amount of movement of the operation shaft;
a range-of-motion adjuster configured to change a maximum push-in position of the operation shaft; and
a range-of-motion adjustment motor configured to operate the range-of-motion adjuster,
wherein the range-of-motion adjuster has a contact portion with which the tip portion of the operation shaft comes into contact, and
the range-of-motion adjuster changes the maximum push-in position of the operation shaft by being operated to change a contact position of the tip portion with respect to the contact portion in the first direction,
wherein the operation shaft is a shaft portion that includes rubber and is provided at a center of a rubber stem, and
the force sensation generator is a skirt portion that includes rubber and surrounds the shaft portion of the rubber stem.

15. An input device comprising:
an operation shaft extending in a first direction, linearly movable in the first direction, and having a tip portion;
a force sensation generator configured to apply a force to the operation shaft;
a sensor configured to detect an amount of movement of the operation shaft;
a range-of-motion adjuster configured to change a maximum push-in position of the operation shaft; and
a range-of-motion adjustment motor configured to operate the range-of-motion adjuster,
wherein the range-of-motion adjuster has a contact portion with which the tip portion of the operation shaft comes into contact, and
the range-of-motion adjuster changes the maximum push-in position of the operation shaft by being operated to change a contact position of the tip portion with respect to the contact portion in the first direction,
wherein the input device, further comprises a control device configured to control the force sensation generator,
wherein the sensor is a position sensor configured to detect a position of the operation shaft, and
the control device is configured to control the force sensation generator in accordance with the position of the operation shaft detected by the position sensor.

16. The input device according to claim 15, wherein the control device is configured to
increase an operation load, applied to the operation shaft by the force sensation generator, in accordance with an increase in a push-in amount of the operation shaft in a case where the push-in amount of the operation shaft is less than a first predetermined amount,
decrease the operation load, applied to the operation shaft by the force sensation generator, in accordance with an increase in the push-in amount of the operation shaft in a case where the push-in amount of the operation shaft is greater than or equal to the first predetermined amount and less than a second predetermined amount, increase the operation load, applied to the operation shaft by the force sensation generator, in accordance with an increase in the push-in amount of the operation shaft in a case where the push-in amount of the operation shaft is greater than or equal to the second predetermined amount, and determine that the operation shaft is in an on-position in a case where the push-in amount of the operation shaft is greater than or equal to a third predetermined amount, the third predetermined amount being greater than the first predetermined amount and less than the second predetermined amount.

17. The input device according to claim 16, wherein, in a case where the maximum push-in position of the operation shaft is changed, the control device is configured to change a load characteristic when the push-in amount of the operation shaft is less than the second predetermined amount, and is configured not to change a load characteristic when the push-in amount of the operation shaft is greater than or equal to the second predetermined amount.

18. The input device according to claim 16, wherein, in a case where the maximum push-in position of the operation shaft is changed, the control device is configured to change a load characteristic when the push-in amount of the operation shaft is less than the first predetermined amount, and is configured not to change a load characteristic when the push-in amount of the operation shaft is greater than or equal to the first predetermined amount.

19. The input device according to claim 15, wherein the control device is configured to, after operating the range-of-motion adjustment motor to change the maximum push-in position of the operation shaft, operate the force sensation generator to cause the tip portion of the operation shaft to contact the contact portion, and use the sensor to detect a stroke amount of the operation shaft, so as to determine the changed maximum push-in position of the operation shaft.

20. The input device according to claim 19, wherein, when power is turned on, the control device is configured to determine an initial value of the maximum push-in position of the operation shaft by operating the force sensation generator to cause the tip portion of the operation shaft to contact the contact portion, and using the sensor to detect the stroke amount of the operation shaft, and subsequently determine a latest value of the maximum push-in position of the operation shaft based on the initial value of the maximum push-in position of the operation shaft and a control amount of the range-of-motion adjustment motor.

* * * * *